US009369518B2

(12) United States Patent
Parakh et al.

(10) Patent No.: US 9,369,518 B2
(45) Date of Patent: Jun. 14, 2016

(54) PRODUCER SYSTEM PARTITIONING AMONG LEASING AGENT SYSTEMS

(71) Applicant: Amazon Technologies, Inc., Reno, NV (US)

(72) Inventors: Vishal Parakh, Seattle, WA (US); Antoun Joubran Kanawati, Seattle, WA (US); Mukul Vijay Karnik, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 276 days.

(21) Appl. No.: 13/927,929

(22) Filed: Jun. 26, 2013

(65) Prior Publication Data

US 2015/0019732 A1 Jan. 15, 2015

(51) Int. Cl.
*G06F 15/173* (2006.01)
*H04L 29/08* (2006.01)
*H04L 12/26* (2006.01)
*G06F 9/00* (2006.01)

(52) U.S. Cl.
CPC ............ *H04L 67/10* (2013.01); *H04L 43/0817* (2013.01); *G06F 9/00* (2013.01)

(58) Field of Classification Search
None
See application file for complete search history.

(56) References Cited

U.S. PATENT DOCUMENTS

| | | | |
|---|---|---|---|
| 5,418,713 A | 5/1995 | Allen | |
| 5,655,081 A * | 8/1997 | Bonnell et al. | 709/202 |
| 6,101,549 A | 8/2000 | Baugher et al. | |
| 6,339,595 B1 | 1/2002 | Rekhter et al. | |
| 6,345,303 B1 | 2/2002 | Knauerhase et al. | |
| 6,400,730 B1 | 6/2002 | Latif et al. | |
| 6,742,044 B1 | 5/2004 | Aviani et al. | |
| 6,785,704 B1 | 8/2004 | McCanne | |
| 6,965,974 B1 * | 11/2005 | Bays et al. | 711/153 |
| 7,822,781 B2 * | 10/2010 | Greene et al. | 707/802 |
| 7,881,320 B1 | 2/2011 | Schumacher et al. | |
| 8,615,764 B2 * | 12/2013 | Salapura et al. | 718/104 |
| 2008/0155537 A1 | 6/2008 | Dinda et al. | |
| 2008/0201409 A1 | 8/2008 | Vul et al. | |
| 2009/0284211 A1 | 11/2009 | Gao et al. | |
| 2010/0180020 A1 * | 7/2010 | Dinger et al. | 709/223 |
| 2010/0246443 A1 | 9/2010 | Cohn et al. | |

(Continued)

FOREIGN PATENT DOCUMENTS

WO WO 2014/210054 A2 12/2014

OTHER PUBLICATIONS

Kwang Mong Sim, "*Agent-Based Cloud Computing*", IEEE Transactions on Services Computing, vol. 5, No. 4, Oct.-Dec. 2012 in 14 pages.
Dinda et al. "Towards virtual networks for virtual machine grid computing", 3rd Virtual Machine Research and Technology Symposium. May 6-7, 2004, San Jose, CA, USENIX Association, US, May 6, 2004, pp. 1-14, SP002470812, Sections 4, 5.3.

(Continued)

*Primary Examiner* — Umar Cheema
*Assistant Examiner* — John Fan
(74) *Attorney, Agent, or Firm* — Knobbe, Martens, Olson & Bear, LLP

(57) ABSTRACT

Processes and systems are disclosed for partitioning a number of producer systems among a number of leasing agents. A leasing agent can identify a set of available producer systems within an environment and can partition the producer systems among each of the number of leasing agents. The leasing agent can then inform the other leasing agents of the producer systems assigned to each of the leasing agents. As the number of available producer systems change, the partitioning process can be repeated to rebalance the assignment of producer systems among the leasing agents.

29 Claims, 16 Drawing Sheets

(56) References Cited

U.S. PATENT DOCUMENTS

2011/0296022 A1   12/2011  Ferris et al.
2012/0109852 A1*   5/2012  Lingam ................ G06F 9/5083
                                                        705/400
2013/0298201 A1*  11/2013  Aravindakshan ... H04L 63/0272
                                                          726/4
2013/0306276 A1*  11/2013  Duchesneau ......... G06F 9/5072
                                                       165/104.21

OTHER PUBLICATIONS

International Search Report and Written Opinion in corresponding PCT Application No. PCT/US2014/043941, Dated Dec. 23, 2014.
International Search Report and Written Opinion in corresponding PCT Application No. PCT/US2014/043939, Dated Dec. 23, 2014.
International Search Report and Written Opinion in corresponding PCT Application No, PCT/US2014/043946, Dated Dec. 23, 2014.

* cited by examiner

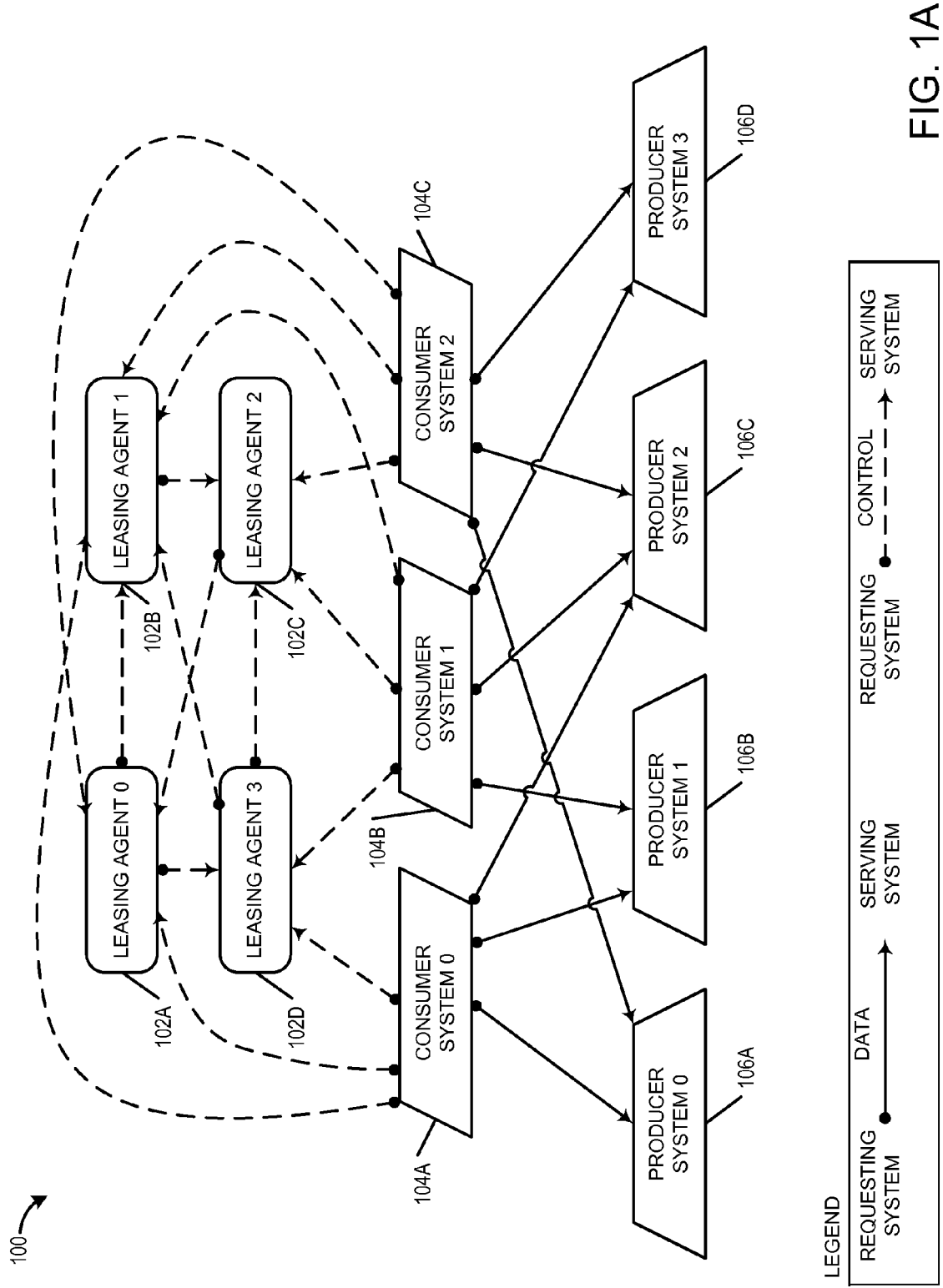

STATE MANAGEMENT TABLE

| SOURCE OVERLAY IP | SOURCE OVERLAY PORT | REQUEST IDENTIFIER | VIRTUAL IP | DESTINATION OVERLAY IP |
|---|---|---|---|---|
| A' | P1 | I1 | X | B' |
| A' | P1 | I2 | X | D' |
| A' | P2 | I1 | X | C' |
| A' | P1 | I1 | Y | K' |
| A' | P2 | I1 | Y | M' |

FIG. 15

PRODUCER SYSTEM PARTITIONING AMONG LEASING AGENT SYSTEMS

RELATED APPLICATIONS

This application is related to the following applications: U.S. application Ser. No. 13/927,892, filed Jun. 26, 2013, and titled "MANAGING CLIENT ACCESS TO A PLURALITY OF COMPUTING SYSTEMS"; U.S. application Ser. No. 13/927,933, filed Jun. 26, 2013, and titled "PRODUCER SYSTEM SELECTION"; and U.S. application Ser. No. 13/927,995, filed Jun. 26, 2013, and titled "PRODUCER SYSTEM PARTITIONING AMONG LEASING AGENT SYSTEMS," the disclosures of which are hereby incorporated by reference in their entirety herein.

BACKGROUND

Often, computing resources and services are provided by a number of computing systems. These computing resources and/or services may be consumed by a number of additional computing systems. In many cases, several computing systems will provide access to the same resource or service. Each of the computing systems that provide the resource or service is typically limited in the number of requests that the system can process during a period of time.

To help provision services to the requesting computer systems, some enterprises utilize a centralized system that can track the usage of each system providing a service or resource. By using the centralized system, the load on each of the provisioning systems can be balanced among the several computing systems that provide the service or resource. One such centralized system is a hardware load balancer. A hardware load balancer can help distribute requests among computing systems that provide a service or resource thereby balancing the load across the provisioning systems of an enterprise.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIG. 1A illustrates an embodiment of a network environment for providing consumer systems with access to services hosted by producer systems.

FIG. 15 illustrates an example of a state management table that can be used to facilitate communication in the overlay network environment.

DETAILED DESCRIPTION

Introduction

Figure 1B:
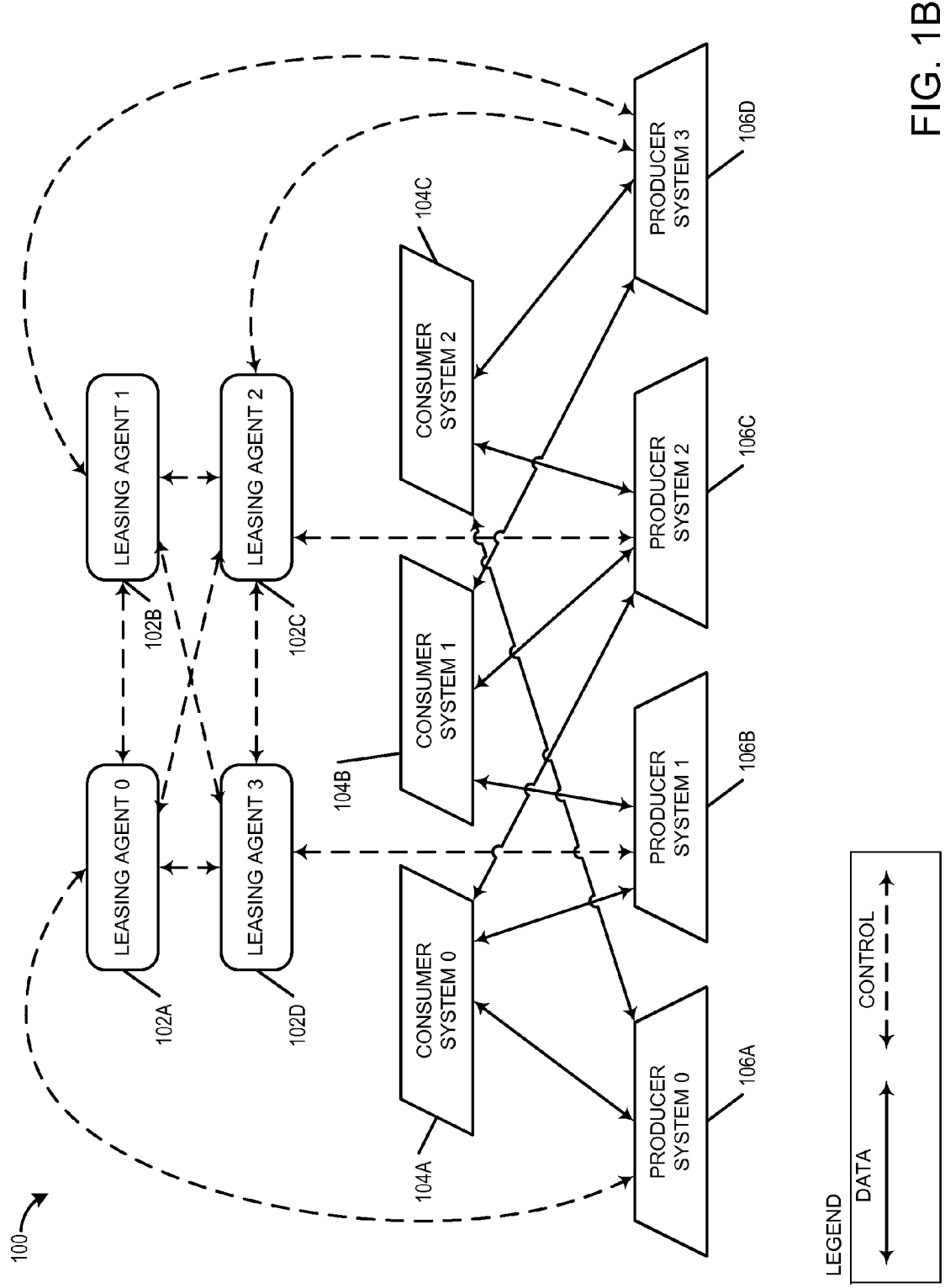
FIG. 1B illustrates an embodiment of a network environment for providing consumer systems with access to services hosted by producer systems and for providing producer system health information to one or more leasing agents.

Although hardware load balancers can be used to help prevent a computing system that provides access to a service or resource, which can be termed a producer system, from becoming overburdened with requests from computing systems requesting access to the service or resource, which can be termed consumer systems, hardware load balancers may suffer from a number of drawbacks. For example, hardware load balancers provide a single point of failure. In other words, if a hardware load balancer malfunctions, an associated enterprise system may become inaccessible because service requests can no longer be forwarded to producer systems. Further, hardware load balancers can be expensive, opaque pieces of hardware that make them unattractive solutions for load balancing an enterprise system.

One solution to the problems associated with hardware load balancers is to use decentralized load balancers. However, although decentralized load balancers will address a number of the issues associated with using a hardware load balancer, the decentralized load balancers tend to be suboptimal because they do not have a global view of the enterprise system and each load balancer is typically limited to servicing a defined subset of consumer and producer systems.

This disclosure describes embodiments of systems and processes that utilize a set of leasing agents to allocate service requests from a plurality of consumer systems among a plurality of producer systems. The leasing agents can monitor and allocate access, or leases, to a subset of producer systems while, in most cases, being aware of the entire plurality of producer systems. Further, for each service request, a single consumer system can interact with several leasing agents and, in some cases, multiple producer systems. The set of leasing agents can, in certain embodiments, serve as an amalgam load balancer in that the process of load balancing may be distributed among a set of distributed hardware-based systems with each leasing agent performing load balancing for a subset of producer systems.

Advantageously, in certain embodiments, by partitioning producer systems among leasing agents while maintaining at least a subset of information about each producer system at each leasing agent, the advantages of both hardware load balancers and decentralized load balancers can be achieved without the aforementioned drawbacks. Further, in certain embodiments, by not assigning consumer systems to specific leasing agents and/or producer systems the load processed by each of the plurality of producer systems can be more balanced over time compared to a system that separates producer systems into isolated subsystems.

In some cases, systems and applications implemented on producer systems and/or consumer systems are modified to function with the leasing agents. For example, as will be described further below, a consumer system may be modified to lease access to producer systems and to maintain status information of the producer systems.

In some embodiments, the systems and methods of the present disclosure can be used with one or more overlay networks that are implemented on top of a set of computing hosts that can host consumer virtual machines and producer virtual machines. Advantageously, in certain embodiments, the systems and methods of the present disclosure can be implemented in the networking infrastructure of the consumer hosts and producer hosts thereby enabling the leasing process to occur without involvement from the consumer and/or producer virtual machines.

When embodiments of the present disclosure are implemented in an overlay network, instead of partitioning the producer systems among leasing agents, the producer virtual machines associated with each overlay network may be separately partitioned among the leasing agents. Further, when leasing producer virtual machines to a consumer virtual machine, the leasing agents can select producer virtual machines assigned to the same overlay network as the consumer virtual machine for which the lease is being requested.

Network Environment Overview

FIG. 1A illustrates an embodiment of a network environment 100 for providing consumer systems 104A-C with access to services hosted by producer systems 106A-D. Generally, the network environment 100 represents a single data center. However, in some cases, the systems of the network environment 100 may be distributed among a plurality of data centers.

The network environment 100 can include a number of producer systems 106A-D (which may be referred to herein singularly as "a producer system 106" or in the plural as the producer systems 106") and consumer systems 104A-C (which may be referred to herein singularly as "a consumer system 104" or in the plural as the consumer systems 104"). Although four producer systems 106 and three consumer systems 104 are illustrated, the network environment 100 can include any number of producer systems 106 and consumer systems 104. Further, although the network environment 100 was previously described as representing one or more data centers, in some embodiments, at least some of the consumer systems 104 may be independent of a data center. For example, in some embodiments, the network environment 100 may be associated with a particular entity or organization. In such embodiments, at least some of the consumer systems 104 may represent user or customer computing systems that can communicate with the network environment 100, but which may be under the control of an individual or separate entity than the rest of the systems associated with the network environment 100.

Generally, each of the producer systems 106 are capable of providing a service and/or computer resource to a consumer system 104. In some cases, the producer systems 106 may each be capable of providing the same services and/or resources to a consumer system 104. In other cases, at least some of the producer systems 106 may be capable of providing different services and/or resources than other of the producer systems 106. These services and/or resources that are provided by the producer systems 106 can include any type of service and/or computing resource. For example, the services and/or computer resources can include: data storage access; external network access (e.g., access to the Internet); internal resource access (e.g., access to databases managed by the same entity as the network environment 100); access to catalog services; access to directory services; access to an application; access to processing services (e.g., for distributed processing of a command or request); routing services (e.g., network routing services); etc. To simplify discussion, the rest of this disclosure will use the term "service" to refer to services, computer resources, or any other resource that may be provided by or via a producer system 106, in addition to the term "service" having its ordinary meaning herein.

The producer systems 106 can include any type of computing system. For example the producer systems 106 can include a client system, a server (e.g., an application server, a web server, etc.), a laptop, a desktop, a database system, a backup system, a directory system, a deduplication system, a storage system, and the like. Similarly, the consumer systems 104 can include any type of computing system. For example, the consumer system 104 can include a client system, a server, a laptop, a desktop, a tablet, a mobile phone, a gaming device, a television, etc. In some embodiments, a consumer system 104 can also serve as a producer system and vice versa. For example, one consumer system 104 may access a producer system 106 to obtain data (e.g., a producer system that serves as a database system or a storage system). The same consumer system 104 may also serve as a producer system by, for example, providing application access to another consumer system 104. In some cases, the consumer systems 104 and the producers systems 106 can be considered client and server systems respectively. However, as discussed above, the consumer systems 104 and the producer systems 106 are not limited as such.

Each time a consumer system 104 desires or requires access to a service provided by a producer system 106, the consumer system 104 can access one or more leasing agents 102A-102D (which may be referred to herein singularly as "a leasing agent 102" or in the plural as "the leasing agents 102") to request access to a producer system 106 capable of providing the service. Generally, a consumer system 104 accesses some subset of the leasing agents 102 to obtain the identity of a producer system 106 to access to fulfill the service request. The subset of leasing agents 102 can be randomly selected from the available leasing agents 102 and include several of the available leasing agents 102. For instance, the request to access a producer system 106 may be provided to three of the four available leasing agents illustrated in FIG. 1A. However, in some cases, a consumer system 104 may be assigned to specific leasing agents 102. Further, in some cases, a consumer system 104 may provide a request to access a producer system 106 to a single leasing agent 102 or to each existing leasing agent 102 in the network environment 100.

FIG. 1A illustrates one example of communication between the leasing agents 102, the consumer system 104 and the producer systems 106. As can be seen in FIG. 1A, each of the consumer systems 104 communicate with three of the four available leasing agents 102. As indicated by the broken arrows, this communication may include control information including, for example, control information relating to requests to access a service provided by a producer system 106 and/or a request to access a producer system 106. Further, as indicated by the solid arrows connecting the consumer systems 104 to a subset of producer systems 106, the communication may include data relating to the producer systems 106 servicing service requests by the consumers 104. In addition, the leasing agents 102 may communicate among themselves to provide, for example, status information relating to the leasing agents 102 and/or the producer systems 106. It should be noted that the illustrated intercommunication between the various systems of the network environment 100 of FIG. 1A is but one example of the communication between consumer systems 104, producer systems 106, and leasing agents 102 and is not intended to be limiting. The communication between the various systems of the network environment 100 is described in further detail with relation to the processes described herein with respect to the FIG. 3-10.

FIG. 1B illustrates an embodiment of the network environment 100 for providing consumer systems 104 with access to services hosted by producer systems 106 and for providing producer system health information to one or more leasing agents 102. As illustrated in FIG. 1B, in some cases, data can be provided both from the producer systems 106 to the consumer systems 104 and from the consumer systems 104 to the producer systems 106. In other words, in some cases, data communication can be bidirectional.

Further, the producer systems 106 can provide health information to the leasing agents 102 thereby enabling the leasing agents 102 to track which producer systems 106 are functioning and which producer systems 106 have resources available to assign to a consumer system 104. In some cases, the producer systems 106 may provide the health information at a scheduled time. In other cases, the leasing agents 102 can request or ping the producer systems 106 for health information. Often, each producer system 106 is assigned to a single leasing agent 102 as illustrated by producer systems 106A-106C. However, in some embodiments, producer systems 106 may be assigned to multiple leasing agents 102, as is the case with the producer system 106D.

Although FIGS. 1A and 1B illustrate different data and control channels, it is possible the network environment 100 to implement some or all of the data and control channels illustrated in FIGS. 1A and 1B. Thus, although FIG. 1B does not illustrate channels between the consumer systems 104 and the leasing agents 102, typically a control channel exists between the consumer systems 104 and the leasing agents 102 as is illustrated in FIG. 1A. Further, some or all of the channels may be unidirectional in which one system requests data, or control information, and the other system provides data, or control information. Alternatively, or in addition, some or all of the channels may be bidirectional in which two systems in communication may both request and provide data, or control information.

Figure 2:
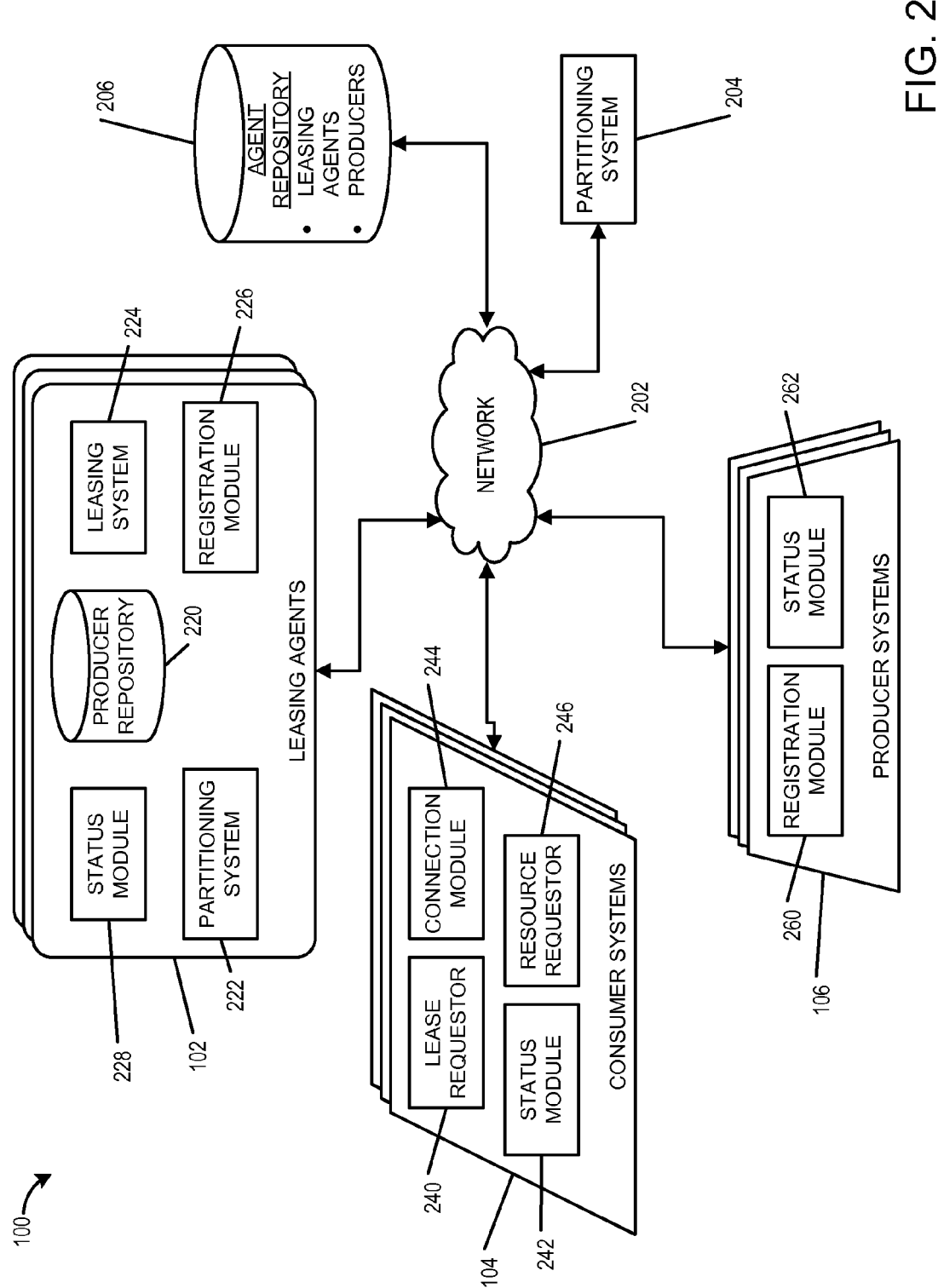
FIG. 2 illustrates an alternative view of an embodiment of a network environment for providing consumer systems with access to services hosted by producer systems.

FIG. 2 illustrates an alternative view of an embodiment of the network environment 100 for providing consumer systems 104 with access to services hosted by producer systems 106. As illustrated in FIG. 2, each of the systems of the network environment 100 can communicate with each other via a network 202. The network 202 can include any type of wired or wireless network and combinations of the same. For example, the network 202 can include a Local Area Network (LAN), a Wide Area Network (WAN), a cellular network, an Ethernet-based network, a WiFi network, a WiLAN network, etc. Further, in some cases, the network 202 can include the Internet.

As illustrated in FIG. 2, each of the systems described in Figure FIG. 1A may include a number of subsystems, which may be implemented in hardware or software. For instance, the consumer systems 104 may include a lease requestor 240, a status module 242, a connection module 244, and a resource requestor 246. The lease requestor 240 may be configured to request a lease of one or more producer systems 106 from one or more leasing agents 102. In some cases, the lease requestor 240 may specifically request access to a producer system 106. In other cases, the lease requestor 240 may request access to a service with or without explicitly requesting access to a producer system 106.

Once the lease requestor 240 has obtained the identity of one or more producer systems 106, the connection module 244 can attempt to establish communication with some or all of the producer systems 106 identified by the leasing agents 102. After a connection has been established with a producer system 106, the resource requestor 246 can request a resource or service from the producer system 106 with which the consumer system 104 has successfully established a connection.

The status module 242 can obtain status information relating to the producer systems 106. This information can then be provided to the leasing agents 102 to facilitate the leasing agents 102 selecting producer systems 106 in response to requests from consumer systems 104 for access to a producer system 106. This information may be provided to corresponding status modules 228 of the leasing agents 102. In some cases, the status module 242 obtains the status information based on the success or lack of success in establishing a connection with the producer systems 106. In other cases, the status information is obtained by querying the producer systems 106 and/or corresponding status modules 262 included as part of the producer systems 106. The status information may include any information regarding connecting with the producer systems 106 and/or the provisioning of service by the producer systems 106. For example, the status information may include information relating to the success or lack thereof in establishing communication between a consumer system 104 and a producer system 106. As another example, the status information may include the number of consumer systems 104 accessing a producer system 106 during a given time period. Further examples, may include information relating to the responsiveness of a producer system 106, the capacity of a producer system 106, the resources available at a producer system, etc.

As illustrated in FIG. 2, the producer systems 106 may include a registration module 260 and a status module 262. As previously described, the status module 262 may provide status information relating to the producer system 106 to a consumer system 104 that requests status information relating to the producer system 106. Further, in some cases, the status module 262 may provide status information to a leasing agent 102 either on its own accord or in response to a request from the leasing agent 102.

The registration module 260 is configured to register the producer system 106 with a leasing agent 102. In certain embodiments, the registration module 260 may automatically register the producer system 106 as part of an initialization routine when the producer system 106 is first activated. In other embodiments, the registration module 260 may register the producer system 106 in response to a command from a user or application. In some cases, the registration module 260 may reregister a producer system 106 upon the producer system 106 determining that its assigned leasing agent is no longer available.

As previously described, the leasing agents 102 may also include a status module 228. The status 228 module can receive status information from one or both of the consumer systems 104 and the producer systems 106 regarding the status of the producer systems 106. In addition, the status module 228 may provide status information associated with a producer system 106 to another leasing agent 102. Further, in some cases, the status module 228 may perform health checks of other leasing agents 102 by requesting status information from the other leasing agents 102. For example, the status module 228 may determine whether a leasing agent 102 is no longer available based on whether a health check request is answered by the leasing agent 102. In some cases, the status module 228 may perform health checks of the producer systems 106 by requesting status information from the producer systems 106.

In addition to the status module 228, the leasing agents 102 can include a producer repository 220, a partitioning system 222, a leasing system 224, and a registration module 226. The producer repository 220 can include any type of database, repository, or storage for storing information relating to the producer systems 106. For example, the producer repository 220 can include status information associated with the producer systems 106, the identity of the producer systems 106, and information relating to the assignments or partitions of the producer systems 106 among the leasing agents 102. In some embodiments, some or all of the information stored at the producer repository 220 may be stored at the agent repository 206 instead of or in addition to the producer repository 220.

The partitioning system 222 can include any system that can partition the available producer systems 106 among the leasing agents 102 of the network environment 100. Generally, the partitioning system 222 partitions the available producer systems 106 into non-overlapping or non-equivalent subsets and then assigns one subset to each leasing agent 102. Thus, if there are four leasing agents 102, then the producer systems 106 may be divided into four subsets with one subset associated with each leasing agent 102. However, in some cases, the subsets may be overlapping. In such cases, a producer system 106 may be assigned or associated with multiple leasing agents 102. The process of partitioning the producer systems 106 among the leasing agents 102 may occur when the network environment 100 is first initialized. In addition, the process may reoccur periodically. For example, the process of partitioning the producer systems 106 may occur each time there is a change in the number of available producer systems 106 or when there is a threshold change in the available producer systems 106, whether through addition or deletion of available producer systems 106.

Each time a consumer system 104 requests access to a producer system 106 from a leasing agent 102, the leasing system 224 can identify a producer system 106 to lease to the consumer system 104 based on a number of factors including, for example, status information associated with the producer system 106, the location of the producer system 106 (e.g., the geographical location, the data center, the server rack, etc.), and whether the producer system 106 has access to the resource the consumer system 104 is seeking to access. Once the leasing system 224 has identified a producer system, the leasing system 224 can provide the requesting consumer system 104 with the identity of the producer system 106. Further, in some cases, the leasing system 224 may provide the consumer system 104 with a lease time that the consumer system 104 is authorized to access the producer system 106. Alternatively, or in addition, the leasing system 224 may provide the consumer system 104 with a quantity of some other consumable resource or metric. For example, the consumable resource can be compute cycles, money, disk storage, connection requests, etc.

The registration module 226 may serve as a counterpart to the registration module 260 of the producer systems 106. Upon receiving a request from a producer system 106 to register with a leasing agent 102, the registration module 260 of the leasing agent 102 may determine whether the producer system 106 is assigned to the leasing agent 102. If so, the registration module 226 can register the producer system 106, which may include storing the availability status of the producer system 106 as well as status information associated with the producer system 106 at, for example, the producer repository 220. If on the other hand the registration module 226 determines that the producer system 106 is not assigned to the leasing agent 102, the registration module 226 can identify another leasing agent 102 that is assigned to the producer system 106 and can inform the producer system 106 of the identity of the leasing agent 102 that is assigned to the producer system 106.

In certain embodiments, the network environment 100 may include an agent repository 206 and/or a partitioning system 204. The agent repository 206 may include information regarding the leasing agents 102 and/or the producer systems 106 included in the network environment 100. The information stored in the agent repository 206 may be used by one or more of the leasing agents 102, the consumer systems 104, and the producer systems 106. For instance, in some cases, the leasing agents 102 may use the agent repository 206 to determine the number and/or identity of the producer systems 106 of the network environment 100. Using this information, the leasing agents 102 can determine how to partition the producer systems 106. In some cases, the consumer systems 104 may use the agent repository 206 to determine where a producer system 106 is located after it is identified by a leasing agent 102 for access by the consumer system 104. As another example of using the agent repository 206, in some cases, a producer system 106 may access the agent repository to determine the identity of a leasing agent 102 to access upon, for example, the producer system 106 first being activated.

In some embodiments, the partitioning system 204 may perform a process for partitioning the producer systems 106 among the leasing agents 102. In such embodiments, the leasing agents 102 may not include their own partitioning systems 222.

In some embodiments, at least some of the modules included in the illustrated systems of FIG. 2 may be integrated with applications and/or resources provided by the systems. For example, the status module 262 of the producer systems 106 may be integrated with applications and/or resources provided by the producer systems 106. Similarly, the status modules 242 may be integrated with an application or service hosted by the consumer systems 104.

Example Process for Accessing a Service at a Producer System

Figure 3:
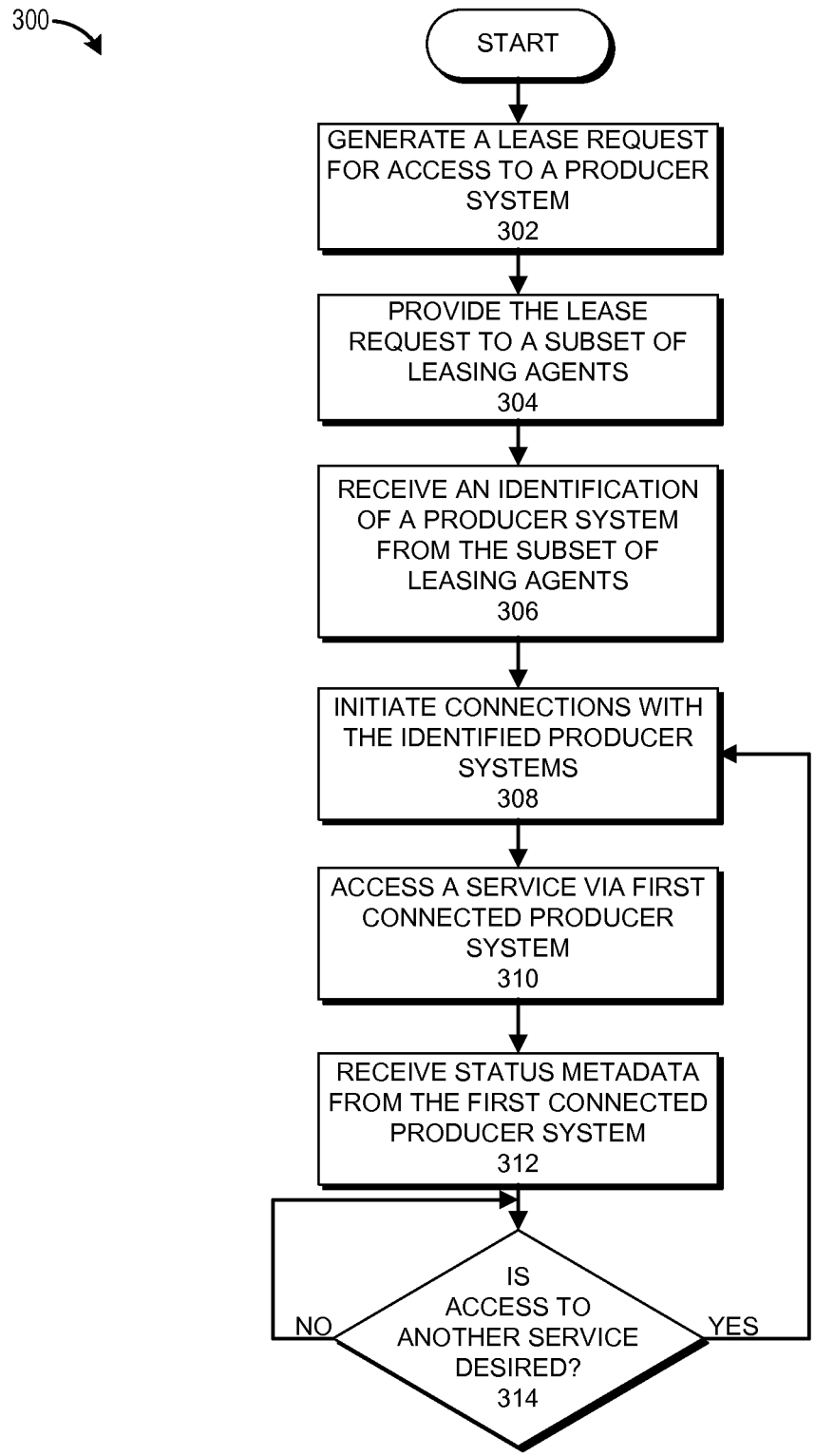
FIG. 3 illustrates an embodiment of a process for accessing a service at a producer system.

FIG. 3 illustrates an embodiment of a process 300 for accessing a service at a producer system 106. The process 300 can be implemented by any system that can access a service or computer resource at a producer system 106 by obtaining a lease or temporary authorization to access the producer system 106 from a leasing agent 102. For example, the process 300, in whole or in part, can be implemented by a consumer system 104, a lease requestor 240, a connection module 244, a resource requestor 246, and a status module 242, to name a few. Although any number of systems, in whole or in part, can implement the process 300, to simplify discussion, portions of the process 300 will be described with reference to particular systems.

The process 300 begins at block 302 where, for example, the lease requestor 240 generates a lease request for access to a producer system 106. In some cases, the lease request may include the identity of a computer resource or service that a user of the consumer system 104 or an application on the consumer system 104 desires to access. In other cases, the lease request includes a request to access a producer system 106 without specifying a service at the producer systems 106 to be accessed by the consumer system 104.

At block 304, the lease requestor 240 provides the lease request to a subset of the leasing agents 102 included in the network environment 100. In some cases, the lease requestor 240 may provide the lease request to some or all available leasing agents 102. The lease requestor 240 may identify the available leasing agents 102 by accessing an agent repository 206, which may include the identity of each leasing agent 102 of the network environment 100. In other cases the consumer systems 104 may each be configured with the identity of the leasing agents 102 upon initialization or activation, or at any other time during operation of the consumer systems 104. For example, a user (e.g., an administrator) may provide the consumer systems 104 with the identity of the leasing agents 102. The identification of a leasing agent 102 may include a name of the leasing agent 102, an address of the leasing agent 102 (e.g., an Internet Protocol (IP) address or other network address), and/or any other information that can be used to identify the leasing agent 102 within the network environment 100. In some embodiments, providing the lease request to a leasing agent 102 can include providing the leasing agent 102 with status information associated with one or more producer systems 106 with which the consumer system 104 has previously interacted.

At block 306, the consumer system 104 receives an identification of a producer system 106 from each of the subset of leasing agents 102 that were provided the lease request at the block 304. In some cases, the consumer system 104 receives an identification of a producer system 106 from some of the subset of leasing agents 102. For example, the consumer system 104 may receive an identification of a producer system 106 from one, two, or the entire subset of leasing agents 102. In cases where the consumer system 104 does not receive the identity of any producer system 106, the process 300 may end, the operations associated with the blocks 302 and/or 304 may be repeated, and/or a user (e.g., an administrator may be alerted). In some cases, receiving the identification of a producer system 106 includes receiving a length of time that the consumer system 104 is authorized to access or lease access to the producer system 106. Each leasing agent 102 from the subset of leasing agents 102 can provide the identity of a single producer system 106. However, in some cases, each of the leasing agents 102 from the subset of leasing agents may provide the identity of multiple producer systems 106. As with the identity of the leasing agent 102, the identity of the producer system 106 can include any information that identifies the producer system 106 to the consumer system 104 or that provides a method to access the producer system 106. For example, the identity of the producer system 106 can include a name, an address (e.g., an IP address), or an identifier that can be used to locate the producer system 106 in a table or data structure stored, for example at the agent repository 206.

In some cases, the block 306 may include receiving status information for the producer system 106 identified by each of the subset of leasing agents 102. This status information may be used to help the consumer system 104 determine which producer system 106 to access. In some cases, the status information may be obtained by the leasing agents 102 communicating with the producer system 106. Alternatively, or in addition, the status information may be obtained from consumer systems 104 who have previously communicated with the producer system 106. The received status information may include an independent set or a subset of the status information available to the leasing agents 102. In some cases, the received status information may or may not intersect with the status information available to the leasing agents 102.

The connection module 244, at block 308, attempts to initiate a connection with each of the producer systems 106 identified at the block 306. In some cases, the connection module 244 may attempt to initiate a connection with a subset of the producer systems 106 identified at the block 306. Attempting to initiate a connection can include any process for attempting to open a communication channel with a producer system 106. For example, attempting to initiate the connection can include sending a connection request packet to the producer system 106. Generally, the connection module 244 may attempt to establish a connection with a producer system 106 as the consumer system 104 receives the identity of the producer system 106. As the consumer system 104 may rarely receive responses simultaneously from multiple leasing agents 102 because, for example, leasing agents 102 may be located at different distances from the consumer system 104 or may have different loads, the connection module 244 may rarely attempt to initiate a connection with multiple producer systems 106 simultaneously. Instead, the attempts to initiate connection with the producer systems 106 may be staggered, if even to a very small degree. However, in some embodiments, the connection module 244 may attempt to initiate connections with multiple producer systems 106 simultaneously. For instance, in some cases, the consumer module 104 may wait until each of the subset of leasing agents 102 responds, or in some situations, response may be received simultaneously from multiple leasing agents 102.

At block 310, the resource requestor 246 accesses or requests access to a service or a computer resource from the first producer system 106 with which the connection module 244 successfully establishes a connection. In some cases, successfully establishing a connection with the producer system 106 can include receiving an acknowledge ("ack") packet or the like from the producer system 106. For similar reasons as described above with respect to the block 308, the connections with the producer systems 106 may be established in a staggered manner. However, in cases where the connection module 244 does successfully establish a connection with more than one producer system 106 simultaneously, or at substantially the same time, the resource requestor 246 can randomly select a producer system 106 from which to request access to a service. Alternatively, the resource requestor 246 can use a selection algorithm to determine which producer system 106 to request the service from. The selection algorithm is not limited and can include, for example, round robin, least recently used (LRU), or any other type of selection algorithm. In some embodiments, the consumer system 104 may request access to a service from some or all of the producer systems 106 with which a communication connection or communication channel has been established. In some cases, the service may be of the same type. In other cases, the consumer system 104 may request access to a different service from each producer system 106.

Further, in cases where a connection is successfully established with more producer systems than the consumer system 104 requires at a particular point in time, the consumer system 104 may relinquish the lease to the one or more additional producer systems 106. Alternatively, the consumer system 104 may maintain the leases to the additional producer systems 106 in a lease pool and may maintain the connections to the additional producer systems 106. In such cases, if at some time during the lease period with the additional producer systems 106 the consumer system 104 requires access to an additional service, the consumer system 104 can utilize the services of one of the additional producer systems 106 whose lease was maintained in the lease pool.

At block 312, the status module 242 receives status metadata from the first connected producer system 106. In some cases, the status module 242 may receive status metadata from each producer system 106 with which the connection module 244 successfully establishes a communication channel. Further, the status module 242 may obtain status metadata from producer system 106 that the connection module 244 has failed to establish a communication channel with. For instance, the fact that the connection module 244 has failed to establish the communication channel with a particular producer system 106 may be included as status metadata associated with the producer system 106. The status metadata is not limited and can include information relating to establishing a connection with the producer system 106, information relating to maintaining the connection with the producer system 106, information relating to the responsiveness of the producer system 106, and information relating to the services available at the producer system 106. For example the status metadata can include the amount of time elapsed in connecting to the producer system 106, latency in the connection to the producer system 106, available processing resources at the producer system 106, the number of times a request must be resent to the producer system 106 (e.g., due to a lost packet), and any other type of data that can be associated with the status of the producer system 106.

In some embodiments, the block 312 may be performed before the block 310. In such cases, the status module 242 may receive status information from each connected producer system 106. The consumer system 104 in such cases can select the producer system 106 to access a service based on the received status information.

At decision block 314, the consumer system 104 using, for example, the resource requestor 246 determines whether access to another service is desired. This other service may be a different service, or it may be the same type of service. For instance, in some cases, one service may be for accessing a network application and another service may be for download network resources (e.g., images or videos hosted by a network page, such as a webpage). Alternatively, both services may be used for downloading network resources. For instance, a user may download two network pages or resources from two network pages. If so, the connection module 244 initiates connections with the identified producer systems 106 at block 308. In some cases, the connection module 244 initiates connections with producer systems 106 identified in a lease pool associated with the consumer systems 244. The lease pool can include the identity of producer systems 106 that are currently leased to the consumer system 104 for providing access to a resource. In some cases, the lease pool includes the producer systems 106 that are leased to the consumer system 104, but which the consumer system 104 is not currently accessing. If a lease pool does not include any leases, the consumer system 104 may use, for example, the lease requestor 240 to perform the process 300 again. In some embodiments, the decision block 314 is optional. For example, if no producer systems 106 are leased to the consumer system 104, the process 300 may be repeated beginning with the block 302.

In some embodiments, the process 300 can be used for renewing a previous lease to a producer system 106. In such cases, the lease request generated at the block 302 can include the identity of the producer system 106 that the consumer system 104 previously accessed. Further the lease request can include an indication that the request is a renewal request. The renewal lease request can then be provided to the leasing agent 102 that originally identified the producer system 106 to the consumer system 104. Assuming that the leasing agent 102 determines that the producer system 106 is still available and/or has capacity for providing service to the consumer system 104, the leasing agent 102 can indicate that the renewal request was approved and can provide a length of time for the renewal lease to the consumer system 104 as part of the block 306. In cases where the consumer system 104 is maintaining a lease with one or more additional producer systems 106 in a lease pool and the lease period lapses for the additional producer systems 106 without the consumer system 104 utilizing services at the additional producer systems 106, the consumer system 104 can allow the leases to lapse without sending lease renewal requests to the leasing agents 102 corresponding to the additional producer systems 106.

In some cases, the process of requesting a lease renewal may occur upon expiration of an existing lease. In other cases, the consumer system 104 using, for example, the resource requestor 246 may determine the probability that an existing service request for accessing a service at one or more producer systems 106 will not be completed before a lease time expires. If the probability satisfies a renewal threshold, the consumer system 104 may request a renewal of the lease of the producer system 106 at some point in time prior to expiration of an existing lease thereby reducing or preventing service outages due to lease expirations.

In certain embodiments, leasing access to a producer system 106 may include providing payment to an organization or entity associated with one or more of the producer system 106 and/or the leasing agents 102. For example, the producer systems 106 may be made available as part of a pay-for-access service. Alternatively, leasing access to a producer system 106 may not require payment of any kind. In such embodiments, leasing refers to the temporary nature of the access to the producer system 106 and not a financial lease.

Figure 4:
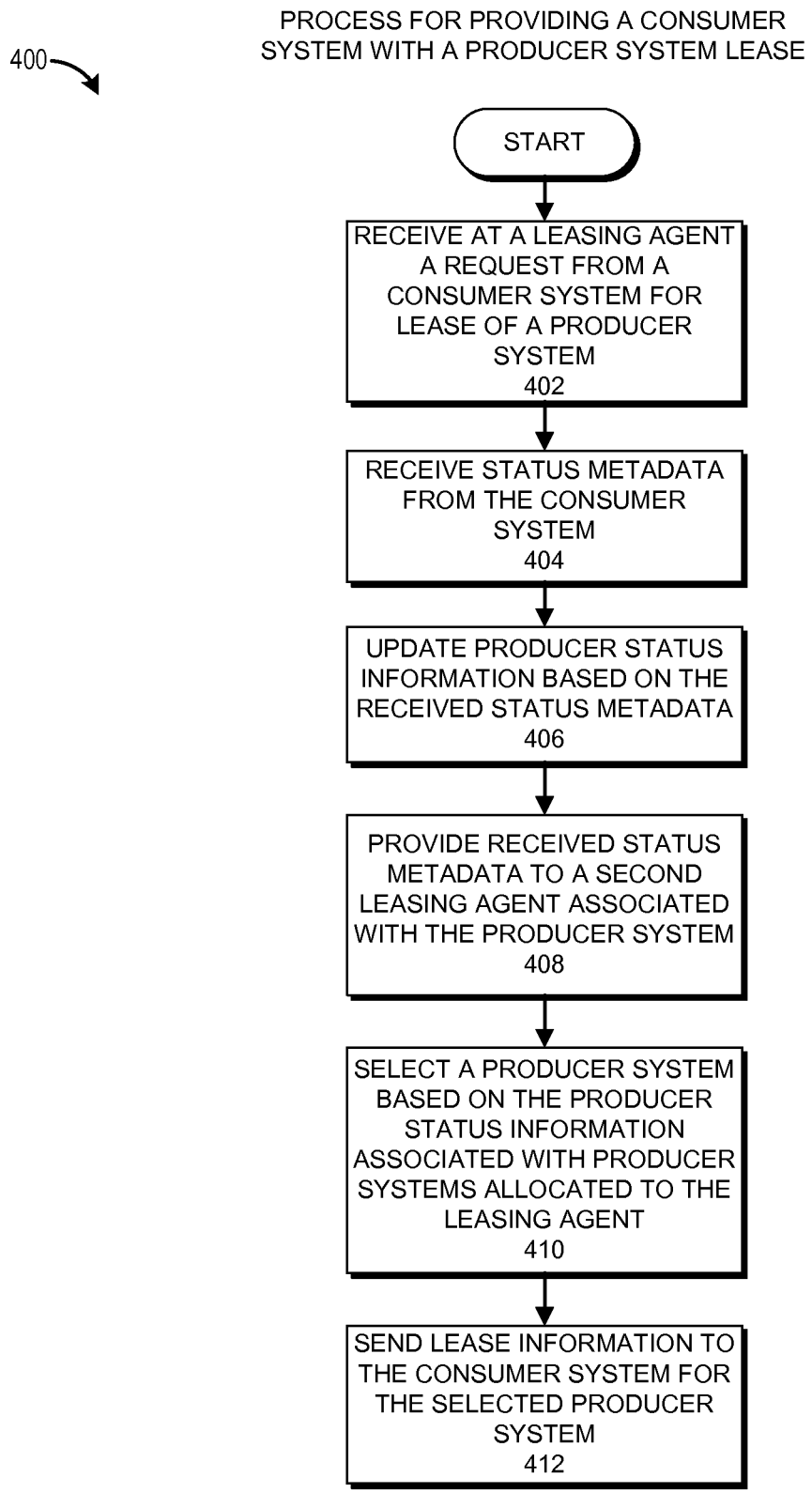
FIG. 4 illustrates an embodiment of a process for providing a consumer system with a lease for a producer system.

Example Process for Providing a Consumer System with a Lease for a Producer System FIG. 4 illustrates an embodiment of a process 400 for providing a consumer system 104 with a lease for a producer system 106. The process 400 can be implemented by any system that can provide a consumer system 104 with the identity of a producer system 106. Further, the process 400 can be implemented by any system that can lease access to a producer system 106 to a consumer system 104. For example, the process 400, in whole or in part, can be implemented by a leasing agent 102, a leasing system 224, and a status module 228, to name a few. Although any number of systems, in whole or in part, can implement the process 400, to simplify discussion, portions of the process 400 will be described with reference to particular systems.

The process 400 begins at block 402 where, for example, the leasing system 224 of a leasing agent 102 receives a request from a consumer system 104 to lease access to a producer system 106. In some instances, the request may include the identity of a specific service or computing resource the consumer system 104 is seeking to access at the producer system 106. As described in the previous section, in some cases, the lease request may include a request to renew an existing lease by the consumer 104 of the producer system 106.

At block 404, the status module 228 may receive status metadata for one or more producer system 106 from the consumer system 104. This received status metadata may include data associated with the consumer system's 104 prior attempts to communicate with or access services from one or more producer systems 106. For example, the received status metadata may include latency information, data relating to the responsiveness of requests by the consumer system 104 to the producer system 106, or any other information previously described with respect to the block 312. Further, the received status metadata may include data that the consumer system 104 received from the producer system 106 and/or data status metadata that the consumer system 104 generated based on its interaction with the producer system 106. In some embodiments, the block 404 may be optional. For instance, if the request is the first request received from the consumer system 104, the consumer system 104 may not have any status metadata to provide to the leasing agent 102.

At block 406, the status module 228 updates producer system status information based on the status metadata received at the block 404. In some cases, updating the producer system status information may include updating an entry associated with a producer system 106 in the producer repository 220. In some embodiments the block 406 may be optional.

Further, at block 408, the status module 228 provides at least some of the status metadata received at the block 404 to a second leasing agent. For instance, the leasing agent 102 performing the process 400 may determine that some of the status metadata is for a producer system 106 assigned to a different leasing agent 102. In such a case, the leasing agent 102 may provide the status information to the leasing agent 102 that is assigned to the producer system 106. In other cases, the leasing agent 102 may provide the status metadata to all leasing agents 102 that the leasing agent 102 is in communication with, which may be some or all of the leasing agents 102 of the network environment 100. Any type of data transmission, replication, and/or synchronization process may be implemented within the network environment 100 to share the status metadata among the leasing agents 102. For instance, a flood fill algorithm or Prim's algorithm may be used to share data among the leasing agents 102. Additional systems and methods that may be used herein for sharing of data among the leasing agents 102 are described in: U.S. application Ser. No. 12/980,133, filed Dec. 28, 2010, and titled "DATA REPLICATION FRAMEWORK"; U.S. application Ser. No. 12/980,153, filed Dec. 28, 2010, and titled "DATA REPLICATION FRAMEWORK"; U.S. application Ser. No. 12/980,193, filed Dec. 28, 2010, and titled "DATA REPLICATION FRAMEWORK"; and U.S. application Ser. No. 12/980,258, filed Dec. 28, 2010, and titled "DATA REPLICATION FRAMEWORK." Each of these aforementioned applications is hereby incorporated by reference in their entirety.

In some embodiments the block 408 is optional. For example, in some embodiments the consumer system 104 only provides status metadata to the leasing agent 102 for producer systems 106 assigned to the leasing agent 102 that received the request at the block 402.

At block 410, the leasing system 224 selects a producer system based on the producer status information associated with each producer system 106 allocated or assigned to the leasing agent 102. In some cases the producer status information is based on information provided by a consumer system 104 (e.g. status metadata received at the block 404). In other cases, the producer status information may be based on information obtained by the leasing agent 102 communicating with the producer system 106. For example, the leasing agent 102 may perform a health or status check of each producer system 106 assigned to the leasing agent 102. These health checks can include pinging the producer system 106, requesting an update of resource availability from the producer system 106, or any other process for obtaining information relating to the status of a producer system 106. Further, the producer status information may be based on information received from other leasing agents 102.

In certain embodiments, selecting the producer system 106 may be based, at least in part, on weights associated with the different producer systems 106. These weights may be generated based on the producer status information. For instance, producer status information that indicates a producer system 106 has low latency and a low error rate when communicating with consumer systems 104 may lead to the producer system 106 being weighted higher and consequently being more likely to be selected at the block 410. Conversely, a producer system 106 that often drops connections to consumer systems 104 may be weighted lower and consequently less likely to be selected at the block 410.

In some cases, the selection of the producer system 106 may be based on any number of additional factors, such as the location of the producer system 106 with relation to the consumer system 104. The location information can include, for example, whether the producer system 106 is located in the same data center or the same server rack as a consumer system 104. Selecting the producer system 106 may be based, in some cases, on the service requested by the consumer system 104. In yet other cases, selection of the producer system 106 may be based in part on an amount of lease time requested by and/or previously allocated to the consumer system 104. In some cases, the leasing system 224 may select the least loaded producer system 106. In other cases, the leasing system 224 may select a producer system 106 from a set of producer systems 106 with a load below a threshold. In some embodiments, the load of a selected producer system 106 is determined to have increased upon selection regardless of whether a consumer system 104 has established a connection with the selected producer system 106. Advantageously, in certain embodiments, by recording an increased load for a selected producer system 106 regardless of established consumer connections to the producer system, the probability of the same producer system 106 being selected more than a threshold number of times within a time period is reduced because although the actual load of the producer system 106 may be low, the anticipated load of future connections to the consumer system 104 is considered in selecting a producer system.

In some cases, selecting the producer system 106 at the block 410 may include selecting the producer system 106 with the lowest load with respect to one or more load metrics (e.g., connections, processor utilization, etc.). Alternatively, selecting the producer system 106 may include selecting a producer system 106 that is among a set of producer systems 106 with a load below a threshold load. The selection of the producer system 106 from among the set of producer system 106 with the load below the load threshold may be random, pseudo-random, or based on a selection algorithm (e.g., least recently used, median load, etc.). Advantageously, in some embodiments, by selecting a producer system 106 from a set of producer system 106 instead of always selecting the producer system 106 with the lowest load, the probability and/or occurrence of load oscillations is reduced. Further, the occurrence of load bubbles, or load hotspots, such as an occurrence of a subset of systems that are associated with a high load compared to the rest of the network environment 100, travelling through the network environment 100 is reduced.

At block 412, the leasing system 224 provides lease information to the consumer system 104 for the producer system 106 selected at the block 410. This lease information can include the identity of the producer system 106 and, in some cases, an amount of lease time for which the consumer system 104 is authorized to access the producer system 106. As previously described, the identity of the producer system 106 can include any information that can facilitate locating and accessing the producer system 106, such as a network address. In some embodiments, providing an identity of the producer system 106 can include providing a certificate or public key to facilitate communicating with the producer system 106.

As previously indicated, in some cases the process 400 can be used for lease renewal requests. In such cases, the block 410 can include determining whether the producer system 106 for which the consumer system 104 has requested a lease renewal is still available for lease. Determining whether the producer system 106 is still available for lease can include determining whether the producer system 106 has resource capacity to continue servicing the consumer system 104. Further, determining whether the producer system 106 is still available for lease can include determining whether one or more metrics of the producer status information associated with the producer system 106 satisfies an availability threshold. For example, the determination can include checking whether an error rate associated with the producer system 106 is below a threshold error rate. If the producer system 106 is available for lease renewal, the leasing agent 102 can send the consumer system 104 an updated lease for the producer system 106. If the leasing agent 102 determines that the producer system 106 is not available for lease renewal, the leasing agent 102 can report as such and/or provide lease information for an alternative producer system 106.

Example Producer System Update Process

Figure 5:
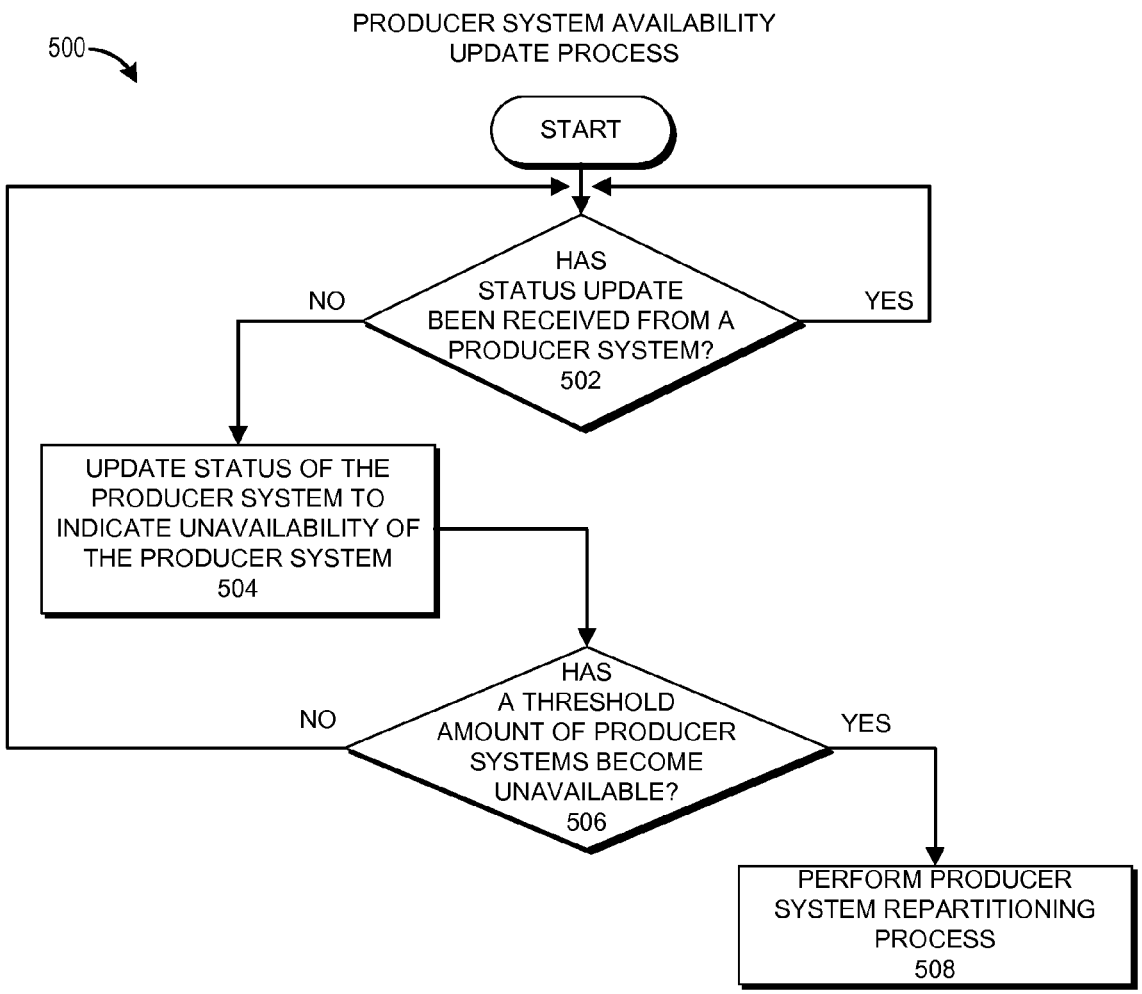
FIG. 5 illustrates an embodiment of a producer system update process.

FIG. 5 illustrates an embodiment of a producer system update process 500. The process 500 can be implemented by any system that can update the availability of producer systems 106 and that can repartition the producer systems 106 among leasing agents 102. For example, the process 500, in whole or in part, can be implemented by a leasing agent 102, a partitioning system 222, a partitioning system 204, a registration module 226, and a status module 228, to name a few. Although any number of systems, in whole or in part, can implement the process 500, to simplify discussion, portions of the process 500 will be described with reference to particular systems.

The process 500 begins at decision block 502 where, for example, the status module 228 of a leasing agent 102 determines whether a status update has been received from a producer system 106. The status update may be expected by the leasing agent 102 in response to a request sent by the leasing agent 102 to the producer system 106. Alternatively, the status module 228 may expect the status update due to an update schedule associated with each producer system 106. For example, in some cases each producer system 106 may be configured to automatically ping or provide a status update to an assigned leasing agent 102 on an hourly or daily basis. If the status update is received, the process 500 returns to decision block 502 to await the next status update. Further, the status module 228 may update producer status information associated with the producer system 106 at the producer repository 220 and/or the agent repository 206.

On the other hand, if the status update is not received at decision block 502 the status module 228 updates the status of the producer system 106 to indicate the unavailability of the producer system 106 at block 504. Updating the status of the producer system 106 can include storing an indication in the producer repository 220 and/or the agent repository 206 that the producer system 106 is not available to be leased to a consumer system 104. In some cases, even when a status update is received at the decision block 502, the status module 228 may update the status of the producer system at the block 504 to indicate that the producer system 106 is not available. For example, if the received status information indicates that the producer system 106 is malfunctioning, is servicing requests at a threshold rate, or is generating errors beyond a threshold error rate, then the status module 228 may update the producer repository 220 and/or the agent repository 206 to indicate that the producer system 106 is no longer available. In some embodiments updating the producer status information of a producer system 106 to indicate its loss of availability may include alerting an administrator that the producer system 106 is no longer available. Updating producer system 106 status information is described in more detail with respect to FIG. 10.

At decision block 506, the partitioning system 222 determines whether a threshold amount of producer systems 106 have become unavailable. If not, the process 500 returns to the decision block 502 to await the next status update. If the partitioning system 222 determines at the decision block 506 that a threshold amount of producer systems 106 have become unavailable the partitioning system 222 performs a producer repartitioning process at the block 508. This producer system repartitioning process is described in further detail below with respect to FIG. 6. In some embodiments, one or both of the decision block 506 and the block 508 are performed by the partitioning system 204.

Example Partitioning Process

Figure 6:
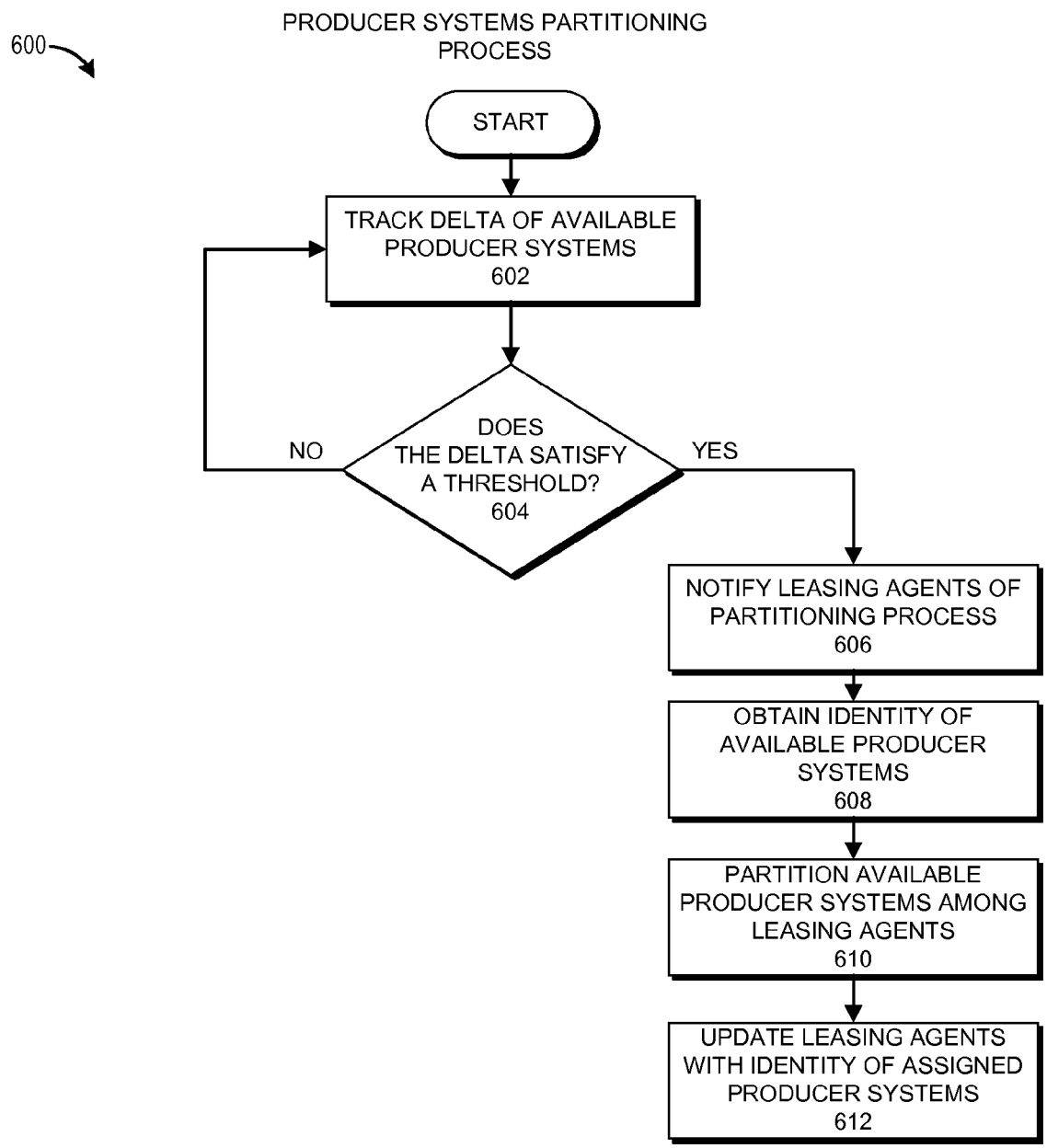
FIG. 6 illustrates an embodiment of a partitioning process for partitioning a set of producer systems.

FIG. 6 illustrates an embodiment of a partitioning process 600 for partitioning a set of producer systems 106. The process 600 can be implemented by any system that can track a change in the number of available producer systems 106 and that can repartition the producer systems 106 among leasing agents 102. For example, the process 600, in whole or in part, can be implemented by a leasing agent 102, a partitioning system 222, a partitioning system 204, a registration module 226, and a status module 228, to name a few. Although any number of systems, in whole or in part, can implement the process 600, to simplify discussion, portions of the process 600 will be described with reference to particular systems.

The process 600 begins at block 602 where, for example, the status module 228 tracks the delta of available producer systems 106. In some cases, the status module 228 tracks the absolute change in the number of available producer systems 106. Alternatively, or in addition, the status module 228 tracks a rate of change in the number of available producer systems 106. The delta or change in available producer systems 106 can be based on the addition of new producer systems 106 or the loss in availability of producer systems 106. In some embodiments, the process 500 may be used to identify the loss in availability of a producer system 106. Further, the determination of available producer systems 106 may be based on user updates indicating the loss or addition of a producer system 106. Moreover, the addition of producer systems 106 may be tracked based on registration attempts by producer systems 106. In some cases, the availability of a producer system 106 may be determined based on information provided by a consumer system 104. Further, the delta, or change, of available producers may be tracked in terms of actual numbers or in terms of the percentage change in the availability of producer systems 106.

In some embodiments, the producer systems 106 and/or delta of available producer systems 106 is tracked by each leasing agent 102. Alternatively, each leasing agent 102 tracks the producer systems available that are assigned to the leasing agent 102. In addition, or alternatively, the count and/or delta of available producer systems 106 is tracked by an independent system, such as the partitioning system 204.

At decision block 604, the partitioning system 222 determines whether the delta of available producer systems 106 satisfies a threshold. This delta can be an absolute value. In other words, the addition or subtraction of producer systems 106 may be tracked. In certain embodiments, the addition and subtraction of producer systems 106 may be tracked independently with a separate threshold associated with each. Thus, in some cases, one or both thresholds may be satisfied even if the total change of available producer systems is zero or does not satisfy a combined threshold. In some cases, the delta can represent a percentage change and/or a rate of change. In such cases, the threshold may be a percentage threshold and/or a rate of change threshold.

If the delta does not satisfy the threshold, or if none of the deltas satisfy the corresponding thresholds, the status module 228 continues to track the available producer systems 106, or the change in available producer system 106, at the block 602. On the other hand, if the delta satisfies the threshold, or a delta satisfies a corresponding threshold, the partitioning system 222 notifies the other leasing agents 102 that the leasing agent 102 performing the process 600 is initiating a partitioning, or a repartitioning process, of the producer systems 106 at the block 606. Advantageously, in certain embodiments, by notifying the other leasing agents 102 that the leasing agent 102 performing the process 600 is initiating a partitioning process, the process 600 avoids having multiple leasing agents 102 perform a partitioning process at the same time, which may cause non-optimal results due, for example, to race conditions in the counting and partitioning of the producer systems 106. In some embodiments, the block 606 may be optional. For example, in some embodiments a partitioning system 204 that is separate from the leasing agents 102 may perform the partitioning or repartitioning process.

At block 608, the partitioning system 222 obtains the identity of the available producer systems 106. The partitioning system 222 may obtain the identity of the available producer systems 106 by accessing the producer repository 220 and/or by accessing the agent repository 206. In some cases, the partitioning system 222 may obtain the identity of available producer systems 106 by contacting other leasing agents 102.

At block 610, the partitioning system 222 partitions the available producer systems 106 among the leasing agents 102. The partitioning system 222 can use any type of partitioning algorithm to partition the producer systems 106. Generally, the partition of the producer systems 106 among the leasing agents 102 generates non-overlapping or non-equivalent sets of producer systems 106 that can be assigned to the leasing agents 102. However, in some cases, the partitioning may be overlapping. Further, in some cases, the subsets may be unbalanced. In other words, some leasing agents 102 may be assigned more producer systems 106 than other leasing agents 102. In cases where the subsets are unbalanced, the number or percentage of producer systems 106 assigned to a particular leasing agent 102 may be based, at least in part, on the number of requests that the leasing agent 102 and/or the producer systems 106 assigned to the leasing agent 102 can process. For example, a first leasing agent 102 may be assigned less producer systems than another leasing agent 102 if the first leasing agent is assigned producer systems 106 that are capable of handling a greater number of consumer system 104 requests than other producer systems 106.

Further, in embodiments where some producer systems 106 can provide different services than other producer systems, the producer systems 106 may be partitioned such that each leasing agent is assigned a producer system that can offer a particular service. Alternatively, the producer systems 106 that can offer the particular service may be partitioned among a select subset of leasing agents 102.

At block 612, the partitioning system 222 of the leasing agent 102 that is performing the process 600 updates each of the other leasing agents 102 in the network environment 100 with the identity of the producer systems 106 assigned to each of the leasing agents 102 upon completion of the block 610. In some embodiments, the block 612 can include updating the leasing agent 102 performing the process 600 with the identity of producer systems 106 assigned to itself. Updating the leasing agent 102 with the identity of the producer systems 106 may include updating a table or database at the producer repository 220. In some cases, because the leasing agent 102 is performing the process 600, the block 612 is optional with respect to the leasing agent 102 and is performed only with respect to the other leasing agents 102 included in the network environment 100.

In some embodiments, the process 600 can be used to provide the initial partitioning of producer systems 106 among the leasing agents 102. For instance, when the network environment 100 is first configured, the delta of available producer systems 106 is likely to satisfy the threshold of the decision block 604 as the available producer systems 106 are activated. Alternatively, or in addition, a user may manually activate a partitioning process as the network environment 100 is first configured, or at any other time.

The process 600 has been described as partitioning the producer systems 106 among the leasing agents 102. However, the process 600 is not limited as such. In some cases, the process 600 may be used to partition leases that can be provided to consumer systems 104 for accessing the producer systems 106 among the leasing agents 102. For example, a leasing agent 102, or partitioning system 222, can identify a set of available producer systems and determine a number of leases available for each producer system of the set of available producer systems. The leasing agent 102 performing the process 600 may be the first leasing agent 102 to detect a threshold changed in available leases or may be a leasing agent 102 designated to perform lease partitioning. The leasing agent 102 may identify the number of leases available based on status information received from each producer system 106 (e.g., during registration of the producer system 106). Alternatively, or in addition, the number of leases available may be determined based on the type of producer system 106 or on configuration information received from the producer system 106 or a user (e.g., an administrator).

The leasing agent 102 may partition the number of leases available for each producer system 106 among a plurality of leasing agent 102 by assigning each leasing agent 102 from the plurality of leasing agents 102 a subset of leases from the number of leases available for each producer system 106. The number of leases may be partitioned equally or substantially equally among the leasing agents 102. In some cases, at least some of the leasing agents 102 may be assigned one more or one less lease due to the number of leases not being a multiple of the number of leasing agents 102. Further, in some cases, leases may not be divided equally because, for example, configuration differences among some leasing agents 102 and/or some producer systems 106. In some cases, each leasing agent 102 is assigned a non-overlapping set of leases. Alternatively, at least some of the leases may be assigned to multiple leasing agents 102. In some embodiments, the plurality of leasing agents 102 that are being partitioned the leases to the producer systems 106 may be a subset of the leasing agents 102. For example, in some cases, a subset of leasing agents 102 may be assigned to a subset of producer systems 106.

After, or while, partitioning the number of leases, the leasing agent 102 performing the process 600 may, for each leasing agent 102 of the plurality of leasing agents 102, provide the leasing agent 102 with the subset of leases assigned to the leasing agent 102. Providing the leases to each of the leasing agents 102 may include providing the number of leases from each producer system 106 assigned to each leasing agent 102 to each of the leasing agents 102. Alternatively, or in addition, providing the leases to each of the leasing agents 102 may include providing an identity of each assigned lease to the leasing agent 102. Further, providing the leases may include providing connection information for communicating with the producer system 106 and/or for utilizing the lease of the producer system 106.

Advantageously, in some embodiments, partitioning the number of leases available for each producer system 106 among the plurality of leasing agents 102 enables a balancing of the workload among the plurality of leasing agents 102. In some cases, it is unnecessary for the leasing agent 102 performing the process 600 to provide itself the subset of leases assigned to itself as it is performing the process 600. However, in some cases, the leasing agent 102 may provide itself with the leases. For example, in cases where the subsystem of leasing agent 102 that performs the partitioning (e.g., the partitioning system 222) and the subsystem that receives and/or tracks the leases assigned to the leasing agent 102 differ, the leasing agent 102 that performs the process 600 may provide itself with the identity of its assigned leases.

In some cases, the process 600 can be used to partition both the producer systems 106 and leases associated with each of the producer systems 106 among the leasing agents 102.

Example Producer System Registration Process

Figure 7:
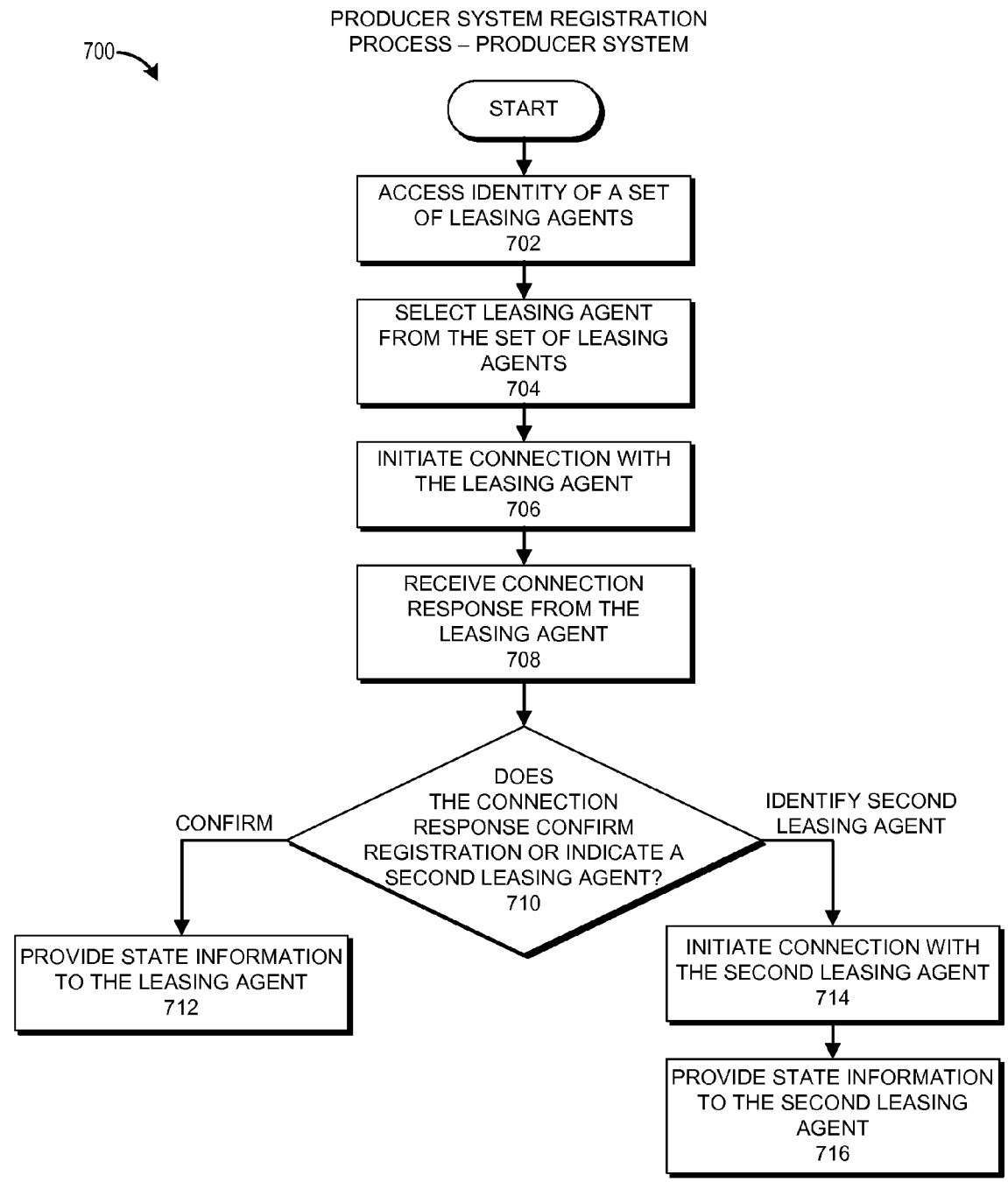
FIG. 7 illustrates an embodiment for a producer system registration process from the perspective of a producer system.

FIG. 7 illustrates an embodiment for a producer system registration process 700 from the perspective of a producer system 106. The process 700 can be implemented by any system that can register a producer system 106 with a leasing agent 102. For example, the process 700, in whole or in part, can be implemented by a producer system 106, a registration module 260, and a status module 262, to name a few. Although any number of systems, in whole or in part, can implement the process 700, to simplify discussion, portions of the process 700 will be described with reference to particular systems.

The process 700 may occur each time a producer system 106 is first activated or initialized, or reactivated or reinitialized after, for example, a period of inactivity or a system restart. In some cases the process 700 may occur or reoccur each time the producer system 106 determines that its assigned leasing agent 102 is no longer available. The determination that the assigned leasing agent 102 is no longer available may be based, for example, on information received from a user, obtained from the agent repository 206, or if an ACK is not received from the assigned leasing agent 102 after the producer system 106 provides a status update, such as the status update described with respect to FIG. 5.

The process 700 begins at block 702 where, for example, the registration module 260 accesses the identity of a set of leasing agents 102 from, for example, the agent repository 206. In some cases, the producer system 106 may access the identity of the set of leasing agents 102 from internal storage. For example, the producer system 106 may be preconfigured with the identity of a set of leasing agents 102. In other cases, a user may specify a leasing agent 102 to access.

At block 704, the registration module 260 selects a leasing agent 102 from the set of leasing agents 102 identified at the block 702. The registration module 260 may select the leasing agent 102 at random or by using any other selection method, such as a round robin or least recently used method. In cases where the set of leasing agents 102 are sorted, the registration module 260 may select the first leasing agent 102 in the sorted set. In certain embodiments, the block 704 may be optional. For example, the block 704 is unnecessary in cases where a user specifies a leasing agent 102.

At block 706, the registration module 260 initiates, or attempts to initiate, a connection with the leasing agent 102 selected at the block 704. In some cases, attempting to initiate the connection with the leasing agent 102 includes an attempt to register with the leasing agent 102.

At block 708, the registration module 260 receives a connection response from the leasing agent 102. The registration module 260 determines at the decision block 710 whether the connection response confirms registration of the producer system 106 or indicates the identity of a second leasing agent 102. If the registration module 260 determines at the decision block 710 that the connection response confirms registration of the producer system 106, the status module 262 provides state information relating to the producer system 106 to the leasing agent 102 at the block 712. This state information can include any information associated with the state or status of one or more metrics associated with the producer system 106. For example, the state information can include the availability of one or more computing resources (e.g., memory, processors, network bandwidth, applications, etc.), the number of consumer systems 104 whose service requests are being processed by the producer system, and any other information associated with the state of a producer system 106.

The process associated with the block 712 may occur upon the registration module 260 determining that the connection response confirms registration of the producer systems 106. Alternatively, or in addition, the process associated with the block 712 may occur at some later time. Further, in some embodiments, the process associated with the block 712 may occur on a continual basis, an intermittent basis, or may occur in response to a request from the leasing agent 102 for an update of the producer system's 106 status. In other embodiments, the process associated with the block 712 may occur each time there is a threshold change in the state or status of the producer system 106. For example, the process associated with the block 712 may occur when the availability of processing resources for the producer system 106 drops to a threshold level.

If the registration module 260 determines at the decision block 710 that the connection response received at the block 708 includes the identification of a second leasing agent, the registration module 260 initiates a connection with the second leasing agent at the block 714. As will be described with respect to the process 800, the second leasing agent may include a leasing agent that a first leasing agent (e.g., the leasing agent identified at the block 704) determined to be associated with the producer system 106.

At block 716 the status module 262 provides state information to the second leasing agent. In certain embodiments the block 716 may include one or more of the embodiments previously described with respect to the block 712. In certain embodiments, the connection response received at the block 708 indicates whether or not the registration by the producer system 106 was successful without identifying any additional leasing agents. In such cases, if the registration of the producer system 106 was not successful the producer system 106 may attempt to register or initiate a connection with another leasing agent from the set of leasing agents identified at the block 702 and instead may repeat the blocks 704, 706, 708, and 710 until a leasing agent 102 confirms registration of the producer system 106.

In some embodiments, the second leasing agent identified at the decision block 710 is selected at random and/or is not necessarily associated with the producer system 106. In such cases, the block 714 can include performing one or more embodiments described above with respect to the blocks 708 and 710, but in relation to the second leasing agent. In other words, a loop can be formed from block 714 to block 708. In such cases, the decision block 710 may identify a third leasing agent if the connection response from the second leasing agent identifies the third leasing agent instead of confirming registration of the producer system 106. This loop may be repeated continuously until the producer system 106 is successfully registered with a leasing agent 102. Alternatively, the loop may be performed a threshold number of times. If the threshold is satisfied without the producer system 106 being successfully registered, an alert may be generated. For example, an administrator may be informed (e.g., via an email or pop-up alert) that a producer system 106 has failed to register with a leasing agent 102. In some cases, such as an unexpected system failure, producer systems 106 may fail to register or update their registrations with a set of leasing agents 102. In such cases, a consumer system 104 may access a cache of connection information, or leases, to attempt to access a producer system 106. Advantageously, in certain embodiments, by using cache information that may be expired, downtime for resource access may in some cases be reduced or eliminated.

Example Producer System Registration Process

Figure 8:
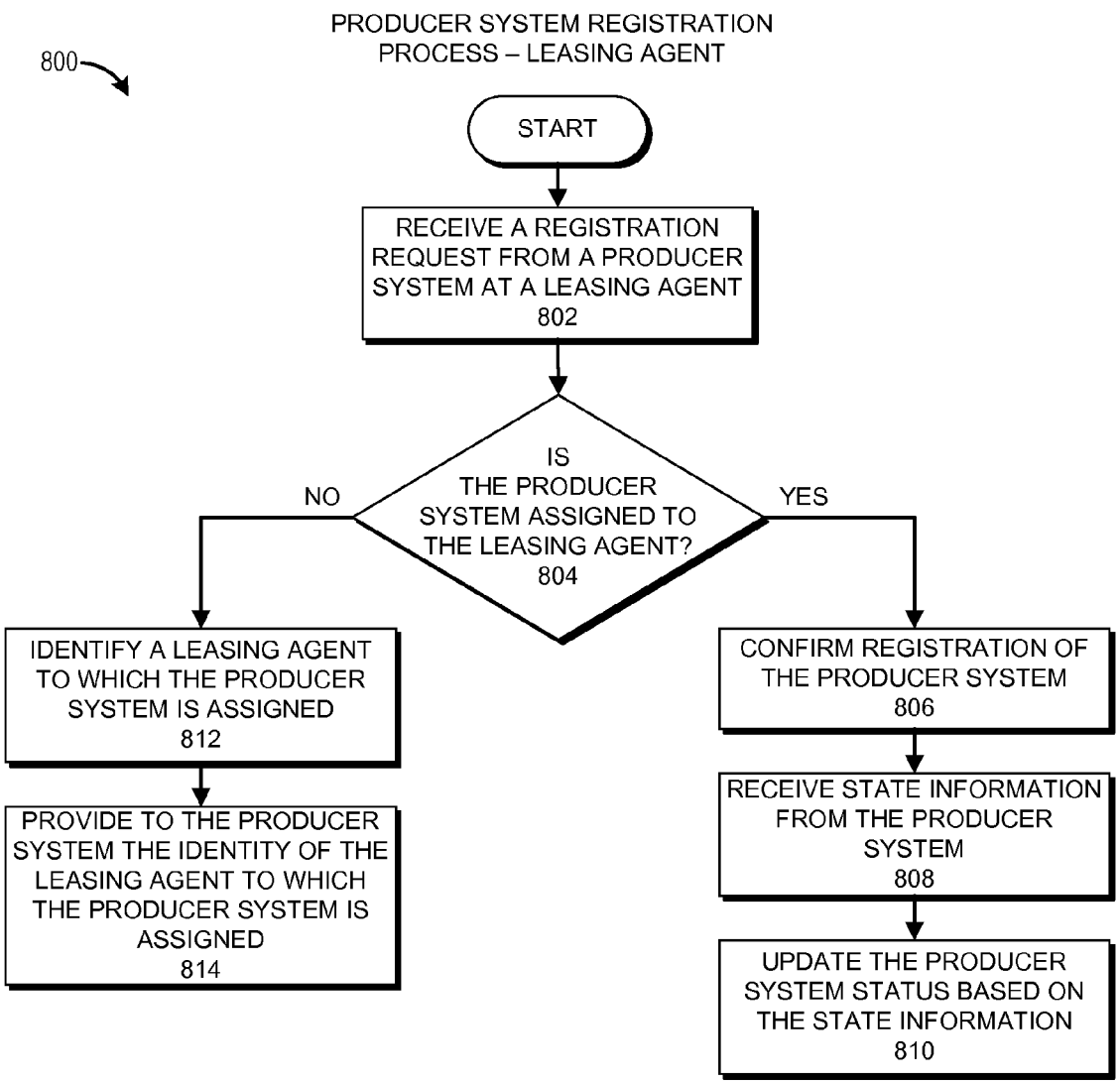
FIG. 8 illustrates an embodiment for a producer system registration process from a perspective of a leasing agent.

FIG. 8 illustrates an embodiment for a producer system registration process 800 from a perspective of a leasing agent 102. The process 800 can be implemented by any system that can register a producer system 106 at a leasing agent 102. For example, the process 800, in whole or in part, can be implemented by a leasing agent 102, a registration module 226, and a status module 228, to name a few. Although any number of systems, in whole or in part, can implement the process 800, to simplify discussion, portions of the process 800 will be described with reference to particular systems.

The process 800 begins at block 802 where, for example, the registration module 226 receives a registration request from a producer system 106. In some embodiments, the registration request can include a certificate or encryption key associated with the producer system 106. The registration module 226 determines at the decision block 804 whether the producer system 106 is assigned to the leasing agent 102. Determining whether the producer system 106 is assigned to the leasing agent 102 can include accessing the producer repository 220 and/or the agent repository 206 to determine whether the producer system 106 is assigned to the leasing agent 102. Further, in some cases, determining whether the producer system 106 is assigned to the leasing agent 102 can include varying the identity of the producer system 106 based, for example, on a received identifier, certificate, or encryption key associated with the producer system 106.

If the registration module 226 determines that the producer system 106 is assigned to the leasing agent 102, the registration module 226 confirms registration of the producer system 106 at block 806. Confirming registration of the producer system 106 can include informing the producer system 106 that it is registered with the leasing agent 102. Further, in some cases, the block 806 can include updating the producer repository 220 and/or the agent repository 206 to indicate that the producer system 106 is available and has registered with the leasing agent 102. Moreover, in some embodiments, the block 806 can include providing the producer system 106 with access to a certificate and/or encryption key associated with the leasing agent 102 and/or assigned to the producer system 106. This certificate and/or encryption key can be used for further communications between the producer system 106 and the leasing agent 102. Moreover, the certificate and/or encryption key can be used for communications between the producer system 106 and the consumer system 104, such as to verify the identity of the producer system 106, or to secure data communicated between the two systems.

At block 808, the status module 228 receives state information from the producer system 106. This state information can include some or all of the embodiments described above with respect to the state information of the block 712. The status module 228 at block 810 can update the producer status information for the producer system 106 based, at least in part, on the state information received at the block 808. Updating the producer status information can include updating an entry, or one or more metrics at the producer repository 220 and/or the agent repository 206 to reflect the status of the producer system 106.

If the registration module 226 determines at the decision block 804 that the producer system 106 is not assigned to the leasing agent 102, the registration module 226, at block 812, identifies another leasing agent with which the producer system 106 is assigned. At block 814 the registration module 226 can provide to the producer system 106 the identity of the leasing agent 102 to which the producer system 106 is assigned enabling the producer system 106 to contact the leasing agent 102 identified at the block 812. In certain embodiments, block 812 and block 814 can be optional. For example in some cases the registration module 226 may inform the producer system 106 that it is not associated with the leasing agent 102 and therefore, that the registration request received at the block 802 was unsuccessful without informing the producer system 106 of an alternative leasing agent 102 to which the producer system 106 is assigned.

Leasing Agent Repartitioning Process

Figure 9:
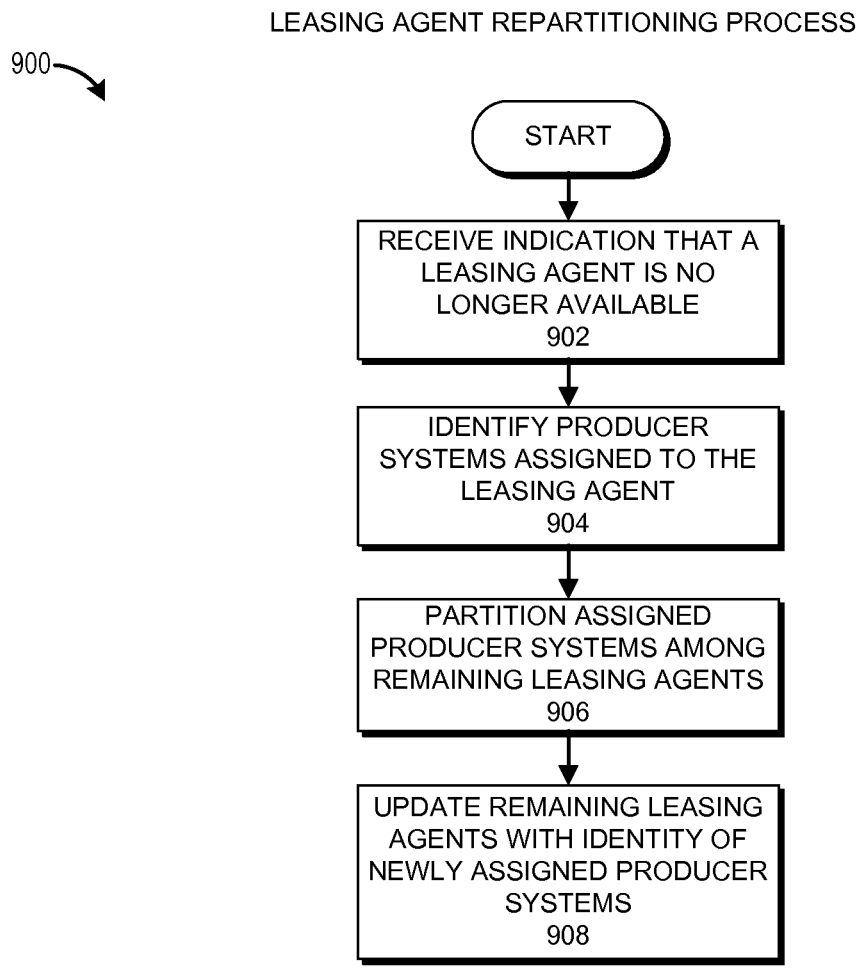
FIG. 9 illustrates an embodiment for a leasing agent repartitioning process.

FIG. 9 illustrates an embodiment for a leasing agent repartitioning process 900. The process 900 can be implemented by any system that can reassign a set of producer systems 106 assigned to a leasing agent 102. For example, the process 900, in whole or in part, can be implemented by a leasing agent 102, a partitioning system 222, and a partitioning system 204, to name a few. Although any number of systems, in whole or in part, can implement the process 900, to simplify discussion, portions of the process 900 will be described with reference to particular systems.

The process 900 begins at block 902 where, for example, a partitioning system 222 associated with a first leasing agent 102 receives an indication that another, or second, leasing agent 102 is no longer available. The indication that the second leasing agent 102 is no longer available may be determined based on, for example, a ping or a status check. In other cases, a partitioning system 222 may determine that a leasing agent 102 is no longer available when a message is not acknowledged by the second leasing agent 102. In yet other embodiments, a user may specify that the second leasing agent is no longer available. In some instances, the process 900 may be performed by the partitioning system 204.

At block 904, the partitioning system 222 identifies producer systems 106 assigned to the leasing agent 102 that is no longer available. The producer systems 106 may be identified by accessing the producer repository 220 and/or the agent repository 206. At block 906, the partitioning system 222 partitions the producer systems 106 identified at the block 904 among the remaining leasing agents 102. In some cases the block 906 may include informing the remaining leasing agents 102 that the partitioning process is occurring thereby preventing multiple leasing agents from simultaneously partitioning the identified producer systems 106 as previously described with respect to the block 610.

In some embodiments, the block 906 may include repartitioning all the available producer systems 106 and not just those assigned to the leasing agent 102 that is no longer available. In such embodiments, the block 904 may include identifying all available producer systems 106. As previously described, the partitioning of producer systems 106 may be overlapping, non-overlapping, equivalent, non-equivalent, and/or may be based on a producer type. Thus, in some embodiments, the block 906 may include some or all of embodiments previously described with respect to the block 610. Further, in some cases, the partitioning of the producer systems 106 that were assigned to the second leasing agent 102 may be based, at least in part, on the type of the second leasing agent 102. For example, if the second leasing agent 102 was assigned exclusively producer systems 106 that provide storage services, then the producer systems 106 that were assigned to the second leasing agent 102 may be repartitioned among a subset of leasing agents 102 that also are exclusively assigned to producer systems 106 that provide storage services or resources.

At block 908, the partitioning system 222 updates the remaining leasing agents 102 with the identity of the producer systems 106 newly assigned to each of the leasing agents 102 that are still available.

In some embodiments, the process 900 may be used for the addition of leasing agents 102 or the replacement of leasing agents 102. In such cases, the block 904 may identify all available producer systems 106 for partitioning at the block 906. In some cases, the available producer systems 106 may be the same producer systems 106 that were available at an earlier time period. In other cases, the set of producer systems 106 may have changed due to loss of producer systems 106 or the addition of producer systems 106. In cases where there is a one-to-one substitution of leasing agents 102, the new leasing agent may be assigned the producer systems 106 of the leasing agent it is replacing. In such cases, the block 906 may be optional and the block 908 may include informing the other leasing agents that the new leasing agent is now assigned the producer systems 106 of the old leasing agent.

Example Hysteresis-Based Producer Selection Process

Figure 10:
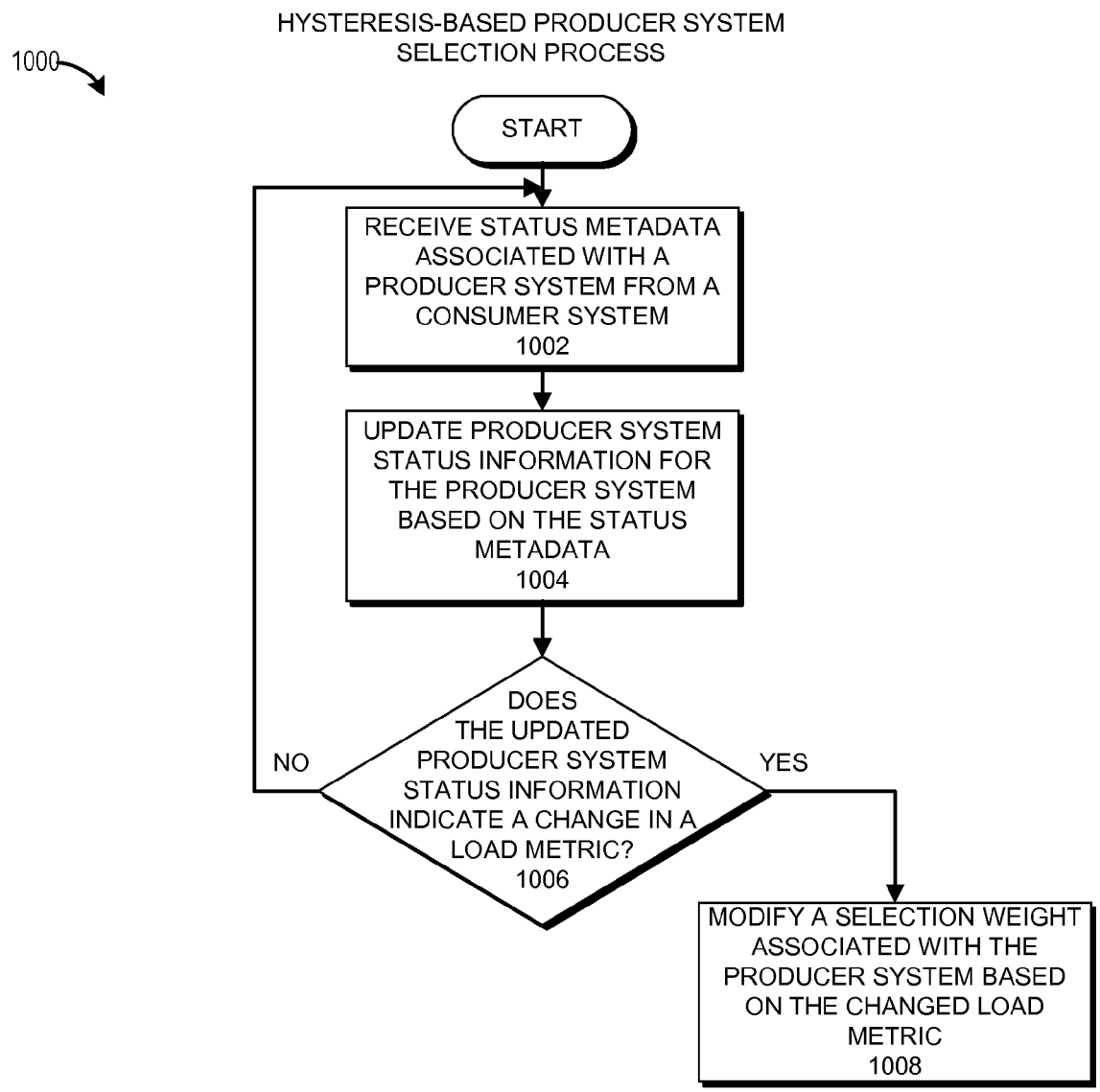
FIG. 10 illustrates an embodiment for a hysteresis-based producer selection process.

FIG. 10 illustrates an embodiment for a hysteresis-based producer selection process 1000. The process 1000 can be implemented by any system that can modify selection weights associated with the producer systems 106 so as to modify the selection of producer systems, such as the selection of a producer system 106 as part of the block 410. For example, the process 1000, in whole or in part, can be implemented by a leasing agent 102, a status module 228, and a leasing system 224, to name a few. Although any number of systems, in whole or in part, can implement the process 1000, to simplify discussion, portions of the process 1000 will be described with reference to particular systems.

The process 1000 begins at block 1002 where, for example, the status module 228 receives status metadata associated with a producer system 106 from a consumer system 104. This status metadata may include information provided by the producer system 106 to the consumer system 104 as well as information that the consumer system 104 has determined based on its interaction with the producer system 106. For example the status metadata may include information relating to the response time of the producer system 106, the amount of consumer systems 104 that the producer system 106 is servicing at a given time, the amount of consumer systems 104 that the producer system 106 services on average over a time period, etc. In some embodiments, the block 1002 can include some or all of the embodiments described above with respect to the block 404.

Further, in some cases, the status module 228 may receive status metadata associated with a set of producer systems 106 that the consumer system 104 has communicated with since the last time the consumer system 104 communicated with the leasing agent 102. The status metadata may be received as part of a renewal request from the consumer system 104 for renewed access to a producer system 106. In other cases, the status metadata may be received as part of a new lease request from a consumer system 104.

At block 1004, the status module 228 updates the producer status information for one or more the producer systems 106 based on corresponding status metadata received at the block 1002. Alternatively, or in addition, the status module 228 may determine that at least some of the received status metadata is for a producer system 106 associated with another leasing system 102 and thus, may provide the status information to the leasing agent 102 assigned to the producer system 106. In some cases, the processes associated with the blocks 1002 and 1004 can serve as a type of "gossip algorithm" in that the consumer system 104 is providing a leasing agent 102 with information about the consumer system's 104 interactions with each of a number of producer systems 106 regardless of whether the leasing agent 102 is assigned to each of the number of producer systems 106. In other words, the leasing agent 102 may obtain "gossip" about a producer system 106 that is assigned to another leasing agent 102. The leasing agent 102 can then spread the "gossip" to the leasing agent 102 that is assigned to the producer system 106. Advantageously, in certain embodiments, by using this "gossip algorithm" the leasing agents 102 can obtain status metadata in between scheduled status updates from the producer systems 106. By obtaining status metadata from the consumer systems 104, as well as the producer systems 106, the selection of producer systems 106 for lease can be further optimized compared to systems that do not use the "gossip algorithm." Additional embodiments of systems and methods for obtaining "gossip," or feedback information for selecting a computing system to provide a service is described in U.S. application Ser. No. 12/544,517, filed Aug. 20, 2009, and titled "DECENTRALIZED REQUEST ROUTING," which is hereby incorporated by reference in its entirety. In some embodiments, the block 1002 can include some or all of the embodiments described above with respect to the block 406 and/or the block 408.

At decision block 1006, the status module 228 determines whether the updated producer status information indicates a change in a load metric associated with the producer system 106. The load metric can include any characteristic of a producer system 106 that has been selected for monitoring. This load metric can relate to the load that can be processed by the producer system 106. In some cases, the load metric can include any metric that relates to the health of a producer system. Some non-limiting examples of load metrics can include, an error rate, a memory utilization rate, a count of connections with consumer systems, etc. If the updated producer status information does not indicate a change in the load metric at decision block 1006, the process 1000 returns to the block 1002 to await new status metadata from a consumer system 104.

In some embodiments decision block 1006 may alternatively or additionally involve determining if there is a change in a value associated with one or more other metrics associated with the producer system 106. For example the status module 228 may determine if the updated producer status information indicates a change in response time by a producer system 106 or a change in available resources by the producer system 106. In some cases, the decision block 1006 may include comparing an updated load metric measurement of the producer system 106 to an average load metric measurement for producer systems 106 in the network environment 100 or for producer systems assigned to the leasing agent 102.

If the updated producer status information indicates that there is a change in the load metric of the producer system 106, the status module 228, at block 1008, modifies a selection weight associated with the producer system 106 based, at least in part, on the changed load metric measurement. Modifying the selection weight can include increasing or decreasing the selection weight based on whether the change in error rate indicates an increased error rate or a decreased error rate. In some embodiments, the producer system 106 is not associated with a selection weight. In such embodiments, if the change in load metric, or other tracked metric, detected at the decision block 1006 satisfies or exceeds a corresponding threshold, the status module 228 may identify the producer system as malfunctioning or unavailable. In such cases, a user such as an administrator may be alerted if the load metric has reached a threshold associated with identifying the producer system 106 as no longer available or malfunctioning. Further, in some cases, the user may be alerted if the load metric, or selection weight changes a threshold amount regardless of the availability of the producer system 106.

In certain embodiments, the selection weight associated with the producer systems 106 may be used to facilitate selecting an available producer system 106 to lease to a consumer system as part of the block 410 associated with the process 400 previously described. The selection weight and/or the availability status of the producer system 106 may be stored at the producer repository 220 and/or the agent repository 206.

Overlay Network Environment Overview

Figure 11:
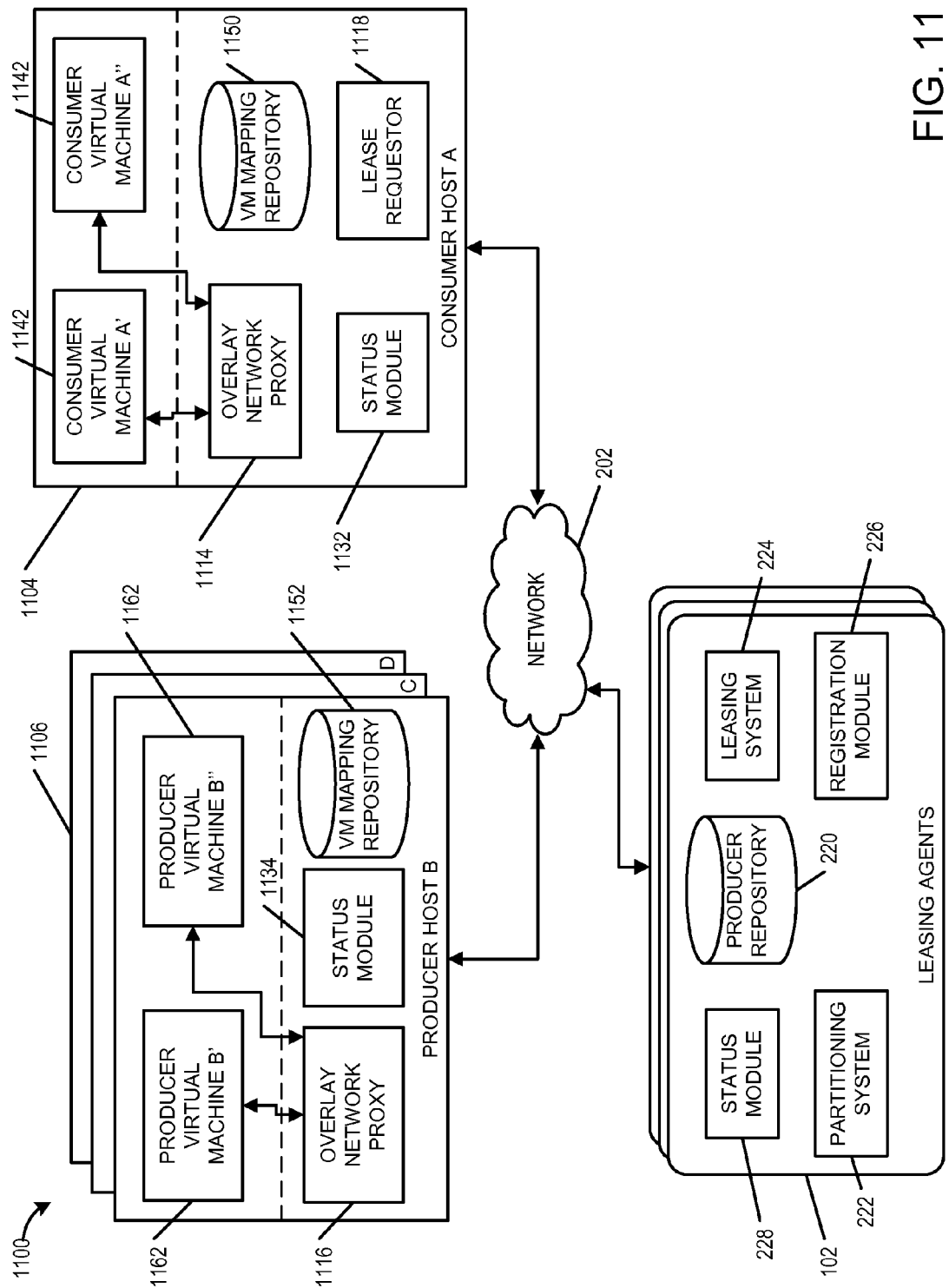
FIG. 11 illustrates an embodiment of an overlay network environment for providing consumer systems with access to services hosted by producer systems.

FIG. 11 illustrates an embodiment of an overlay network environment 1100 for providing consumer systems with access to services hosted by producer systems. The overlay network environment 1100 can include any type of system that can provide one or more overlay networks, or virtual network, to one or more organizations or entities. These overlay networks may be implemented on computing hardware that may form a physical or non-virtual network. Some examples of overlay or virtual networks that may be used with the present disclosure are described in U.S. application Ser. No. 12/827,268 (now U.S. Pat. No. 8,296,459), which was filed on Jun. 30, 2010, the disclosure of which is hereby incorporated in its entirety by reference.

The overlay network environment 1100 includes leasing agents 102, consumer hosts 1104, and producer hosts 1106, each of which may communicate with one another via the network 202. Each of the leasing agents 102 may include some or all of the subsystems illustrated and described with respect to FIG. 2. Thus, for example, the leasing agents 102 may include a producer repository 220, a partitioning system 222, a leasing system 224, a registration module 226, and a status module 228. Although each of these subsystems of the leasing agents 102 can include the same functionality as has previously been described with respect to FIG. 2, in some cases these subsystems may include modified or additional capabilities. For example, in addition to, or instead of, receiving status information relating to consumer systems 104 and producer systems 106, the status module 228 can receive status information relating to one or more of the consumer hosts 1104, the producer hosts 1106, the consumer virtual machines 1142, and the producer virtual machines 1162. Similarly, the producer repository 220 can include information relating to one or more of the consumer hosts 1104, the producer hosts 1106, the consumer virtual machines 1142, and the producer virtual machines 1162.

In some cases, the partitioning system 222 can be used to partition producer virtual machines 1162 among the leasing agents 102 of the overlay network environment 1100. Further, producer virtual machines 1162 associated with a particular overlay network can be partitioned independently of producer virtual machines 1162 associated with other overlay networks. Thus, for example, the producer virtual machine B' may be partitioned to a leasing agent 102 independently of the producer virtual machine B". In some cases, a subset of available leasing agents 102 may be associated with a particular overlay network. In such cases, producer virtual machines 1162 and consumer virtual machines 1142 associated with the particular overlay network may limit communications to the subset of available leasing agents 102.

Further, the leasing system 224 may select a producer virtual machine 1162 to lease to a consumer virtual machine 1142 based on the overlay network with which the producer virtual machine 1162 and the consumer virtual machine 1142 are associated. In some cases, selecting a producer virtual machine 1162 based on the overlay network may be in addition to the factors previously described with respect to selecting a producer system 106 to least to a consumer system 104. Moreover, the registration module 226 can be used to register producer virtual machines 1162 with the leasing agents 102.

Although only a single consumer host 1104 is illustrated in FIG. 11, the overlay network environment can include a plurality of consumer hosts 1104. Each of the consumer hosts 1104 may include a number of consumer virtual machines 1142. Some of the consumer virtual machines 1142 may be associated with different overlay networks than other consumer virtual machines 1142 hosted by the consumer host 1104. For example, the consumer host 1104 includes two consumer virtual machines 1142 each associated with a different overlay network. The consumer virtual machine A' may be associated with a first overlay network, which may also include the producer virtual machine B', and the consumer virtual machine A" may be associated with a second overlay network, which may also include the producer virtual machine B".

In addition to the consumer virtual machines 1142, the consumer host 1104 may include an overlay network proxy 1114, a lease requester 1130, a virtual machine mapping repository 1150, and a status module 1132. The overlay network proxy 1114 can include any system that can process service requests from a consumer virtual machine 1142 and that can provide a service request for processing to a producer host 1106 that is hosting a producer virtual machine 1162. In some embodiments, a service request received from a consumer virtual machine 1142 may include a virtual address associated with a producer virtual machine 1162 or a non-existent system that the consumer virtual machine 1142 beliefs can process it service request. Upon receiving the service request with the virtual address, the overlay network proxy 1114 can identify a producer virtual machine 1162 for processing the service request in the same overlay network as the consumer virtual machine 1142 that provided the service request. The overlay network proxy 1114 can then replace the virtual address with the address of the identified producer virtual machine 1162. As will be described in more detail below, the producer virtual machine 1162 may be identified from a pool of leased producer virtual machines 1162 associated with the consumer virtual machine 1142 that provided the service request. Further, the overlay network proxy 1114 can wrap or encapsulate the service request with a header or an outer header that identifies a producer host 1106 that hosts the identified producer virtual machine 1162 and that identifies the consumer host 1104.

The virtual machine mapping repository 1150 can store the pools of producer virtual machines 1162 leased on behalf of the consumer virtual machines 1142. Further, the virtual machine mapping repository 1150 can store the identity of corresponding producer hosts 1106 that host the producer virtual machines 1162. Storing the identity of producer virtual machines 1162 and producer hosts 1106 can include storing addressing information for accessing the producer virtual machines 1162 and the producer host 1106.

To obtain leases on behalf of consumer virtual machines 1142, the consumer host 1104 can include a lease requester 1118 that can generate lease requests on behalf of a consumer virtual machine 1142 hosted by a consumer host 1104. The lease requester 1118 can identify a specific overlay network and/or a specific consumer virtual machine 1142 for which a lease of a producer virtual machine 1162 is being requested.

The status module 1132 can include some or all of the embodiments described above with respect to the status module 242. Further, the status module 1132 can provide status information for producer virtual machines 1162 and/or producer hosts 1106 based on communications with the producer virtual machines 1162 and the producer hosts 1106.

As with the consumer hosts 1104, the overlay network environment 1100 can include any number of producer hosts 1106 each of which can include one or more producer virtual machines 1162 associated with one or more overlay networks. Further, each of the producer hosts 1106 can include an overlay network proxy 1116, a virtual machine mapping repository 1152, and a status module 1134.

Similar to the overlay network proxy 1114, the overlay network proxy 1116 can include any system for processing service requests received from a consumer host 1104 and for processing responses to the received service requests. Upon receiving a service request, the overlay network proxy 1116 can determine the producer virtual machine 1162 to process the service request based on information included in a header of the service request. Further, in some cases, the service request may identify a specific overlay network, which may be used to facilitate identifying the producer virtual machine 1162 to process the service requests.

The virtual machine mapping repository 1152 can store information identifying which producer virtual machines 1162 are associated with which overlay networks. Further, the virtual machine mapping repository 1152 can store information to facilitate identifying which consumer hosts 1104 host particular consumer virtual machines 1142. This information can be used to determine a consumer host 1104 to provide a response to a service request.

As with the status module 1132, the status module 1134 can include one or more of the embodiments previously described with respect to the status module 262. Further, the status module 1134 can provide status information relating to the producer virtual machines 1162 to the leasing agents 102.

As indicated by the dashed lines of the consumer hosts 1104 and the producer host 1106, the underlying systems that enable the processes disclosed herein can be separated from the virtual machines that form the one or more overlay networks of consumers (e.g., clients) and producers (e.g., servers or service providers). In some cases, the underlying systems (e.g., the overlay network proxies 1114 and 1116) can be implemented as part of the networking infrastructure of the consumer hosts 1104 and the producer hosts 1106. Advantageously, in certain embodiments, by separating the underlying systems from the virtual machines, the leasing structure can be implemented, maintained, and modified without impacting the overlay networks.

In some embodiments, the consumer hosts 104 can host both consumer virtual machines 1142 and producer virtual machines 1162. Further, in some cases, the producer hosts 1106 can host both consumer virtual machines 1142 and producer virtual machines 1162. Moreover, although the consumer virtual machines 1142 and producer virtual machines 1162 have been described as virtual machines, they are not limited as such. In some embodiments, the overlay networks may be assigned hardware resources and/or software resources that are part of or are executed by the consumer hosts 1104 and the producer hosts 1106. These resources may be used in placed of the virtual machines to implement producer systems and consumer systems as part of an overlay network.

In some cases, one or more of the processes previously described with respect to the network environment 100 may be performed or modified to be performed with respect to the overlay network environment 1100. Thus, for example, the process 900 may be performed to repartition leasing agents in the overlay network environment 1100. As a second example, the processes 700 and 800 can be performed to register a producer virtual machine 1162 with a leasing agent 102 in the overlay network environment 1100.

Example Process for Accessing a Service of a Producer Virtual Machine

Figure 12:
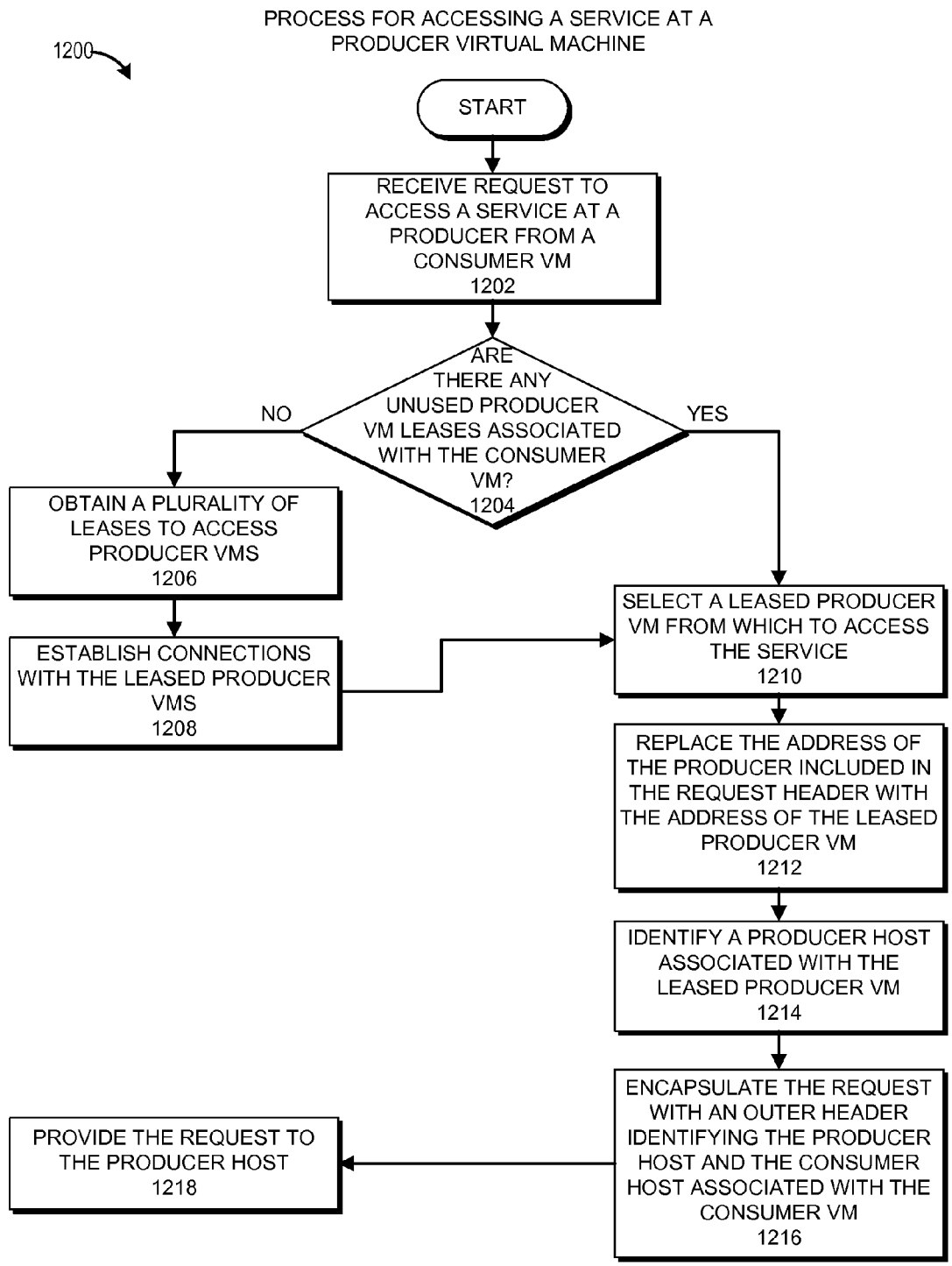
FIG. 12 illustrates an embodiment of a process for accessing a service at a producer virtual machine.

FIG. 12 illustrates an embodiment of a process 1200 for accessing a service at a producer virtual machine. The process 1200 can be implemented by any system that can process a request from a consumer virtual machine to access a service provided by a producer virtual machine. For example, the process 1200, in whole or in part, can be implemented by a consumer host 1104, a leasing agent 102, an overlay network proxy 1114, and a lease requestor 1118, to name a few. Although any number of systems, in whole or in part, can implement the process 1200, to simplify discussion, portions of the process 1200 will be described with reference to particular systems.

In some cases, the process 1200 may be used to enable a consumer virtual machine to access a service provided by a producer system. Similarly, in some embodiments, the process 1200 may be used to enable a consumer system to access a service provided by a producer virtual machine. However, to simplify discussion, the process 1200 will be described with respect to a consumer virtual machine attempting to access a service of a producer virtual machine.

The process 1200 begins at block 1202 where, for example, the overlay network proxy 1114 of a consumer host 1104 (e.g., the consumer host A) receives from a consumer virtual machine 1142 (e.g., the consumer virtual machine A') a request to access a service at a producer. Alternatively, or in addition, the request received at the block 1202 may be a data packet to be provided to a producer. For example, the data packet may be data to be used in conjunction with a service or for facilitating use of a service at the producer for which the consumer virtual machine is already established access. In some embodiments, the request may include a packet with a header indicating that the request, or the packet, is addressed to a virtual address X from an address A associated with the consumer virtual machine 1142. For instance, the received packet may be as follows: {A', X, Data}, indicating that the Data is being sent from A' to X. The data field of the packet may include a request and/or data to facilitate performing a request or an operation at a producer virtual machine 1162. In certain embodiments, the consumer virtual machine 1142 may be unaware that the address X is a virtual address, but may instead believe that the address X refers to a physical producer system. Moreover, as previously mentioned, in some embodiments an overlay network may comprise consumer systems other than or in addition to consumer virtual machines. In such embodiments, the block 1202 may include receiving a request to access the service at the producer from a consumer system implemented on or hosted by a consumer host 1104. Similarly, a producer host may include producer systems other than or in addition to producer virtual machines which may be configured to provide services to consumer systems.

At decision block 1204, the overlay network proxy 1114 determines if there are any unused producer virtual machine leases associated with the consumer virtual machine 1142. Determining if there are any unused producer virtual machine leases associated with the consumer virtual machine 1142 may include accessing a virtual machine mapping repository 1150 to determine if there is a lease pool associated with the consumer virtual machine 1142. Further, in some cases, the decision block 1204 may include determining if the lease pool includes any unused leases for producer virtual machines associated with the consumer virtual machine 1142.

If the overlay network proxy 1114 determines at the decision block 1204 that there are no unused producer virtual machine releases associated with the consumer virtual machine 1142, the lease requester 1130 obtains a plurality of leases to access producer virtual machines at block 1206. An example of a process for obtaining one or more leases to access one or more producer virtual machines is described in more detail with respect to FIG. 14 below.

At block 1208, the overlay network proxy 1114 attempts to establish connections with the leased producer virtual machines 1162 obtained at the block 1206. In some cases, the block 1208 can include storing lease information associated with each leased producer virtual machine for which the overlay network proxy 1114 successfully establishes a connection.

After the overlay network proxy 1114 establishes connections with the leased producer virtual machines at the block 1208, or if the overlay network proxy 1114 determines at the decision block 1204 that there are unused producer virtual machine leases associated with the consumer virtual machine 1142, the process 1200 proceeds to block 1210. At block 1210, the overlay network proxy 1114 selects a leased producer virtual machine 1162 from which to access the service requested by the consumer virtual machine 1142. The producer virtual machine 1162 may be selected using any type of selection algorithm, such as round-robin or least recently used. In other cases, the producer virtual machine 1162 may be selected based on the order that a connection was established with the producer virtual machine 1162. In yet other cases, the producer virtual machine 1162 may be selected at random and/or selected based on the service request received that the block 1202. Alternatively, in some cases, the overlay network proxy 1114 may access the virtual machine mapping repository 1150 to facilitate selecting the producer virtual machine 1142. For example, the overlay network proxy 1114 may access a lease pool, which may be stored as a table identifying available producer virtual machines 1162, stored at the virtual machine mapping repository 1150.

In some cases, the overlay network proxy 1114 may select a leased producer virtual machine 1162 that has a load below a threshold. In such cases, the overlay network proxy 1114 may select at random from the producer virtual machines 1162 that have a load below a threshold. This load may refer to any measurable metric that relates to the utilization of the producer virtual machine 1162. For example, the load may refer to a processor load, a network connection load, a number of consumer connections with the producer virtual machine 1162, a lowest latency in a connection, a measure of performance of the producer virtual machine 1162, etc.

Further, in some cases, each lease may be associated with cost. For example, a consumer, or an entity associated with the consumer, may be charged for each second of use, for each megabyte of data communicated or processed, or for each compute cycle of a producer virtual machine 1162. In such cases, the overlay network proxy 1114 may select the leased producer virtual machine 1162 based on the cost of the available leased producer virtual machines 1162.

At block 1212, the overlay network proxy 1114 replaces the address of the producer (e.g., the virtual address X) included in the request header (e.g., an inner header) with the address of the leased producer virtual machine 1162 that was selected at the block 1210. Thus, for example, the packet received at the block 1202 may now be as follows: {A', B', Data}. In some embodiments, the block 1212 may be optional. For example, in some embodiments, each leased producer virtual machine 1162 may be associated with a port. Thus, instead of replacing the virtual address X with an address of the leased producer virtual machine 1162, the packet may be communicated to the hosting producer via the port associated with the leased producer virtual machine 1162. As a second example, the packet may be communicated to a producer host, and the producer host may determine the leased producer virtual machine 1162 to receive the packet based, for example, on the virtual address X.

At block 1214, the overlay network proxy 1114 identifies a producer host 1106 associated with the leased producer virtual machine. The producer host 1106 may be identified by accessing a state table stored at the virtual machine mapping repository 1150.

The overlay network proxy 1114, at block 1216, encapsulates the request with an outer header identifying the producer host 1106 identified at the block 1214 and the consumer host 1104 associated with the consumer virtual machine 1142. Thus, for example, the packet may now be as follows: {A, B {A', B', Data}}, indicating that the packet is being sent from the consumer host A to the producer host B. Alternatively, in some cases, the identity of the producer host 1106 and the consumer host 1104 may be included with or added to the request header of the request received at the block 1202 and the packet may be as follows: {A, B, A', B', Data}, indicating that the packet is being sent from the consumer host A to the producer host B. In such cases, after the process associated with the block 1216 completes the request includes a single header instead of two headers comprising the inner header and the outer header. In some embodiments, the block 1216 may include an identity of the overlay network associated with the consumer virtual machine 1142 that provided the request at the block 1202 and the producer virtual machine 1162 identified at the block 1210. Thus, for example, the packet may indicate that the request is associated with the ' or first overlay network, as opposed to the " or second overlay network, as follows: {A, B, ', A', B', Data}, indicating that the packet is being sent from the consumer host A to the producer host B and that the service request is from a consumer virtual machine to a producer virtual machine included in the ' overlay network. Advantageously, in some embodiments, by including an identity of the overlay network with service requests and responses to service requests, addresses may be reused among different overlay networks. However, in cases where each virtual machine and each system is associated with a unique address, providing the identity of the overlay network may be optional.

In some embodiments, the overlay network proxy 1114 can determine address information for accessing producer virtual machines from a state management table stored at the virtual machine mapping repository 1150. This state management table can include connection information for accessing the leased producer virtual machine 1162 selected at the block 1210. Further, the state management table can include a mapping of virtual addresses to producer virtual machine addresses. Additionally, the state management table can include a mapping of producer virtual machines 1162 to their respective producer hosts. An example of such a state management table that maps virtual addresses to producer virtual machines is illustrated in FIG. 15.

At block 1218, the overlay network proxy 1114 provides the request to the producer host identified at the block 1214. This request may be provided to the producer host 1106 via the network 202.

Figure 13:
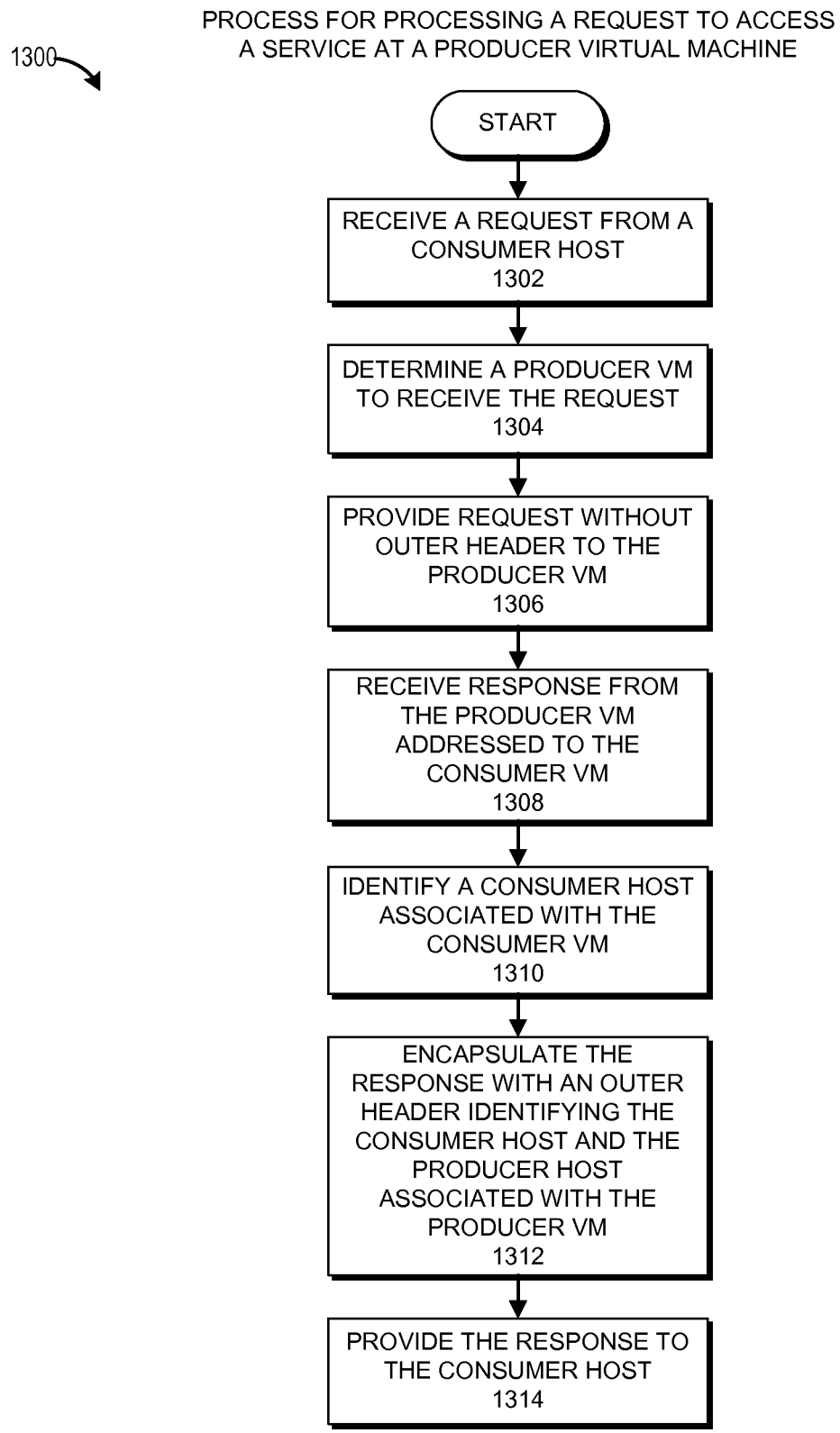
FIG. 13 illustrates an embodiment of a process for processing a request to access a service at a producer virtual machine.

Example Process for Processing a Request to Access a Service at a Producer Virtual Machine FIG. 13 illustrates an embodiment of a process 1300 for processing a request to access a service at a producer virtual machine. The process 1300 can be implemented by any system that can process a request to access a service at a producer virtual machine received from a consumer host. For example, the process 1300, in whole or in part, can be implemented by a producer host 1106, an overlay network proxy 1116, and a producer virtual machine 1162, to name a few. Although any number of systems, in whole or in part, can implement the process 1300, to simplify discussion, portions of the process 1300 will be described with reference to particular systems.

In some cases, the process 1300 may be used to enable a producer virtual machine to provide a service requested by a consumer system. Similarly, in some embodiments, the process 1300 may be used to enable a producer system to provide a service requested by a consumer virtual machine. However, to simplify discussion, the process 1300 will be described with respect to a producer virtual machine providing access to a service requested by a consumer virtual machine.

The process 1300 begins at block 1302 where, for example, the overlay network proxy 1116 of a producer host 1106 (e.g., the producer host B) receives a request from a consumer host 1104. The request may be formatted, for example, as follows: {A, B, ', A', B', Data}, indicating that the packet is being received from the consumer host A and is intended for the producer host B and that the service request is from a consumer virtual machine to a producer virtual machine included in the ' overlay network. In many cases, the received request is a request to access a service hosted by a producer virtual machine 1162 posted by the producer host 1106. However, in some cases, the received request may instead be a data packet configured to provide data to the producer virtual machine 1162 to facilitate performing a service for which access has already been established by a consumer virtual machine 1142 hosted by the consumer host 1104.

At block 1304, the overlay network proxy 1116 determines a producer virtual machine 1162 (e.g., the producer virtual machine B') to receive the request. In some embodiments, the block 1304 may include de-encapsulating an outer header from the request received at the block 1302. In such cases, the packet may be as follows: {A', B', Data}, indicating that the packet is being received from the consumer virtual machine A' and is intended for the producer virtual machine B'. In such cases, the overlay network proxy 1116 may access an inner header to identify the producer virtual machine 1162. Alternatively, or in addition, the overlay network proxy 1116 may identify the producer virtual machine 1162 to receive the request by accessing the outer header.

In some cases, the overlay network proxy 1116 provides the request without an outer header to the producer virtual machine 1162 identified at block 1304. Thus, the packet may be as follows: {A', B', Data}. However, in other cases the request may be provided as received from the consumer host 1104, including with the outer header if included with the received request. Thus, the packet may be as received at the block 1302 (e.g., {A, B, ', A', B', Data}).

At block 1308 the overlay network proxy 1116 receives a response from the producer virtual machine 1162 addressed to the consumer virtual machine 1142 that caused the request received at the block 1302 to be generated. In some embodiments, the response may be addressed to a different consumer virtual machine. For example, the request from the consumer virtual machine may be a request to transfer files from the producer virtual machine to another consumer virtual machine. This packet may be similar to the packet received at the block 1202 and may be as follows: {B', A', Data}, indicating that the producer virtual machine B' is sending Data (e.g., a response to the service request) to the consumer virtual machine A'. In block 1310, the overlay network proxy 1116 identifies the consumer host 1104 associated with the consumer virtual machine 1142. The consumer host 1104 may be identified by accessing a mapping table at the virtual machine mapping repository 1152. This mapping table may map consumer virtual machines 1142 to the consumer hosts 1104 that host the consumer virtual machines 1142. Typically, each consumer host 1104 may host a plurality of consumer virtual machines 1142. However, some cases one or more consumer hosts 1104 may host a single consumer virtual machine 1142.

The overlay network proxy 1116, at block 1312, encapsulates the response with an outer header identifying the consumer host 1104 and the producer host 1106 associated with the producer virtual machine 1162. Thus, the packet may be as follows: {B, A {B', A', Data}}. As described with respect to the block 1216, in some cases, the identity of the consumer host 1104 and the producer host 1106 may be included with or added to an existing header of the response received at the block 1308. Thus, the packet may be as follows: {B, A, B', A', Data}. Similarly, as described with respect to the block 1216, the outer header, or the header of the response if only one header exists, may include an identity of the overlay network associated with the producer virtual machine 1162 and the consumer virtual machine 1142. Thus, the packet may be as follows: {B, A, ', B', A', Data}.

The producer host 1106 provides the response to the consumer host 1104 at block 1314. In some embodiments, the producer host 1106 may provide the response via a network 202.

In some embodiments, the consumer host 1104 may perform the process 1300, or a similar process, to provide the response received at the block 1308 to the corresponding consumer virtual machine 1142. Further, in some cases, the overlay network proxy 1114 of the consumer host 1104 may identify a virtual address (e.g., the virtual address X) used to create an initial request provided by the consumer virtual machine 1142. Using this identified virtual address, the overlay network proxy 1114 may replace an address in the received response identifying the producer virtual machine 1162 with the virtual address that was used to create the initial request provided by the consumer virtual machine 1142. Thus, for example, before the packet is provided to the consumer virtual machine A', the packet may be reformulated as follows: {X, A', Data}, indicating that the response was received from system X instead of from producer virtual machine B', which may actually have generated the Data included in the packet.

Example Process for Leasing Access to a Producer Virtual Machine

Figure 14:
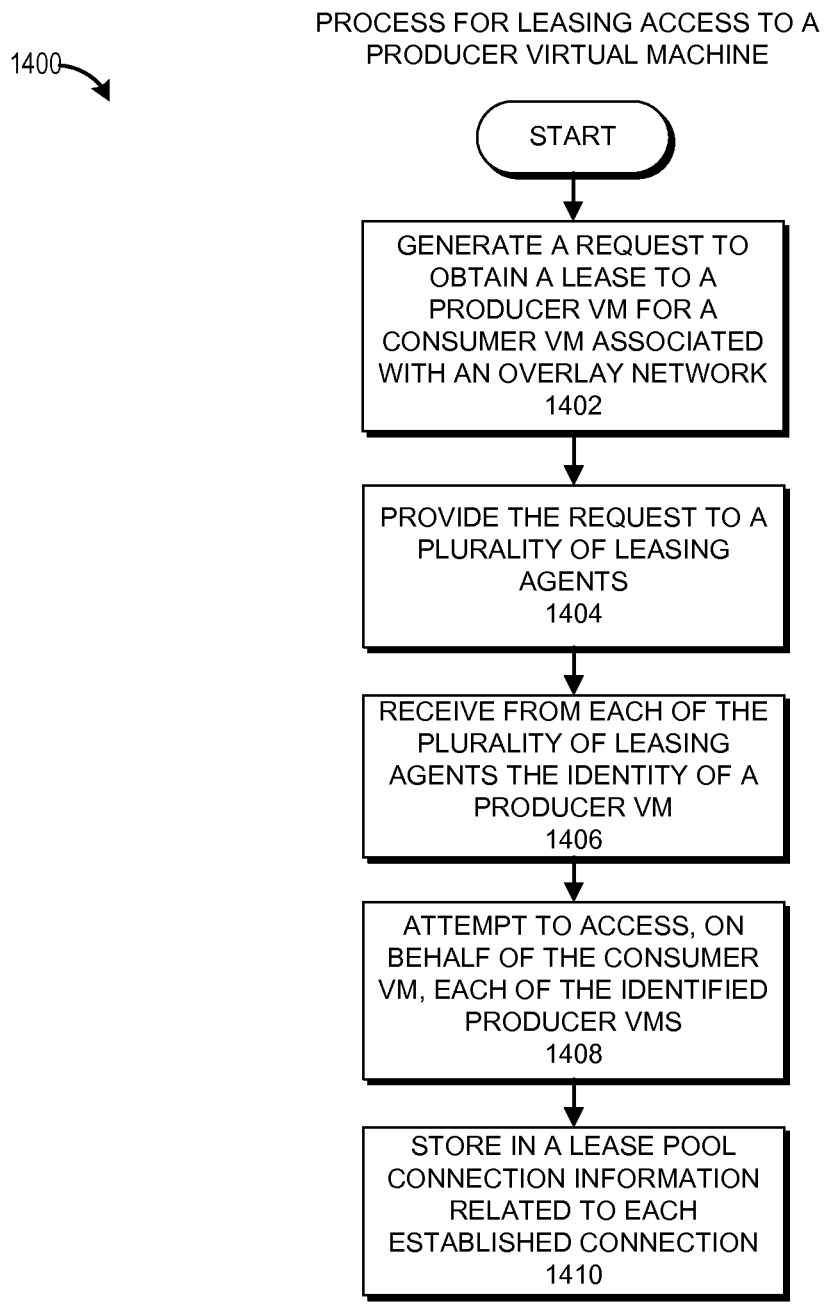
FIG. 14 illustrates an embodiment of a process for leasing access to a producer virtual machine.

FIG. 14 illustrates an embodiment of a process 1400 for leasing access to a producer virtual machine. The process 1400 can be implemented by any system that can obtain a lease to access a producer virtual machine 1162 (e.g., the producer virtual machine B'). For example, the process 1400, in whole or in part, can be implemented by a consumer host 1104 lease requestor 1130, a leasing agent 102, an overlay network proxy 1114, and a leasing system 224, to name a few. Although any number of systems, in whole or in part, can implement the process 1400, to simplify discussion, portions of the process 1400 will be described with reference to particular systems.

The process 1400 begins at block 1402 where, for example, the lease requester 1130 generates a request to obtain a lease to a producer virtual machine 1162 for a consumer virtual machine 1142 associated with an overlay network. The process associated with the block 1402 may occur at initialization of the consumer virtual machine 1142. Alternatively, or in addition, the block 1402 may occur in response to a determination that there are no unused producer virtual machine leases associated with the consumer virtual machine 1142 (e.g., as may be determined at the decision block 1204 associated with the process 1200).

At block 1404, the lease requester 1130 provides the request to a plurality of leasing agents 102. In some embodiments, the plurality of leasing agents 102 may comprise a subset of leasing agents 102 included in the overlay network environment 1100. Further, in some cases, the request may be provided to a single leasing agent 102.

At block 1406, the lease requester 1130 receives from each of the plurality of leasing agents 102 the identity of a producer virtual machine 1162 associated with the same overlay network as the consumer virtual machine 1142 for which the request was generated at the block 1402. Typically, each of the plurality of leasing agents 102 provides the identity of a single producer virtual machine 1162. However, in some cases, one or more of the leasing agents 102 may provide the identity of multiple producer virtual machines 1162. Further, it is possible for a leasing agent 102 to provide the identity of zero producer virtual machines 1162. For example, if each producer virtual machine 1162 associated with a particular leasing agent 102 is utilized beyond a threshold utilization rate, the leasing agent 102 may not provide the identity of a producer virtual machine 1162. In such a case, the leasing agent 102 may alert the user, such as administrator, that each producer virtual machine 1162 associated with the leasing agent 102 is utilized above a threshold utilization rate.

In some embodiments, in addition to receiving the identity of a producer virtual machine 1162, leasing information associated with leasing the producer virtual machine 1162 may be received at the block 1406. This leasing information may include an address for accessing the producer virtual machine 1162, the identity and/or address of a producer host 1106 that hosts the producer virtual machine 1162, and/or the identity of a consumable resource for an amount a consumable resource allocated to the consumer virtual machine 1142 for the lease of the producer virtual machine 1162. This consumable resource may include any type of resource for measuring a lease period of the producer virtual machine 1162. For example, the consumable resource may include a period of time, a number of operations, an amount of data to be processed by and/or received from the producer virtual machine 1162, or any other metric for measuring utilization of the producer virtual machine 1162 by the consumer virtual machine 1142.

At block 1408, and overlay network proxy 1114 attempts to access, on behalf of the consumer virtual machine 1142, each of the producer virtual machines 1162 identified at the block 1406. In some embodiments, the block 1408 can include attempting to establish connections with each of the producer virtual machines 1162. In other embodiments, the block 1408 can include attempting to communicate over established connections with the producer virtual machines 1162. At block 1410, the overlay network proxy 1114 stores, in a lease pool, connection information related to each established connection. This connection information may include information for identifying a connection and how to use the connection to access a service. For instance, the connection information may include any of the information received as part of the block 1406, such as the identity of the consumable resource for the identity of the producer host 1106 that hosts the producer virtual machine 1162. In some embodiments, the lease pool and/or the connection information may be stored at the virtual machine mapping repository 1150.

Similar to the process 300, in some embodiments, the process 1400 may be used to renew a lease for a producer virtual machine 1162. In such embodiments, the block 1402 may include generating a request to renew an existing or previously existing lease for a producer virtual machine. The renewal request may include the identity of the existing producer virtual machine lease. Further, the block 1406 may include receiving an indication of whether the renewal request was granted and, in some cases, leasing information relating to an additional grant of a consumable resource (e.g., lease time, or processor usage).

Example of a State Management Table

FIG. 15 illustrates one non-limiting example of a state management table 1500 that can be used to facilitate communication in the overlay network environment 1100. The state management table 1500 can include a number of pieces of information that facilitate communication between a consumer virtual machine 1142 and a producer virtual machine

1162. For example, the state management table 1500 may include a column for a source overlay address 1502, a source overlay port 1504, a virtual address 1506, and a destination overlay address 1508: As indicated by some of the table headings (e.g., the source overlay address 1502) in the state management table 1500, the address may be an Internet Protocol (IP) address. However, the addresses are not limited as such and may take other forms or follow other protocols.

In the example of FIG. 15, the illustrated portions of the state management table 1500 are associated with the consumer virtual machine A'. As shown in the virtual address 1506 column, the consumer virtual machine A' may use multiple virtual addresses, X and Y. Further, each virtual address may be associated with multiple destination overlay addresses associated with multiple producer virtual machines. For instance, the virtual address Y may be associated with the producer virtual machine with the address K' and with the producer virtual machine with the address M'. As multiple destination addresses may be mapped to a virtual address, the overlay network proxy 1114 may also identify a port, as indicated in the source overlay port 1504 column to direct the data packet to the right destination. Thus, to send the service request to the producer virtual machine K', the overlay network proxy 1114 would substitute the virtual address Y with the address for K' and use port P1. Similarly, to send the service request to the producer virtual machine M', the overlay network proxy 1114 would substitute the virtual address Y with the address for M' and use port P2.

In many cases, an overlay network may be implemented using layer 3 and/or layer 4 of the Open System Interconnection (OSI) model. Typically, with an overlay network implemented using layer 3 and/or layer 4, the networking infrastructure is unaware of the applications that are communicating across the network. This can make load balancing more challenging because it is more difficult to anticipate a priori how much data will be transmitted between a consumer virtual machine and a producer virtual machine.

One solution is to create a protocol aware load balancing system that is implemented, at least in part, using layer 7 of the OSI model. In such a system, the overlay network proxy 1114 can, in some embodiments, examine the packets being transmitted by the consumer virtual machine 1142 to determine the type of service the consumer virtual machine 1142 is attempting to access, or a protocol type associated with the service request, and whether the service requests are for a single service, or multiple services, of the same or of different types. Thus, for example, if the overlay network proxy 1114 determines that a consumer virtual machine is requesting access to a website using HTTP requests, and each HTTP request is for different webpages or different features of a webpage, the overlay network proxy 1114 can send the different requests to different producer virtual machines 1162 for processing without the consumer virtual machine 1142 being aware that the requests are being processed by different systems. Thus, in some cases, a single connection may be demultiplexed over a set of connections. The overlay network proxy 1114 may split a series of requests to multiple producer virtual machines 1162 to increase efficiency or the rate that requests are processed. Further, if the overlay network proxy 1114 determines that the consumer virtual machine 1142 is creating a lot of load on a producer virtual machine 1162, the overlay network proxy 1114 can swap the producer virtual machine 1162 that is processing requests and/or split requests among multiple producer virtual machines 1162. Swapping the producer virtual machine 1162 can be accomplished, in some cases, by associating a request identifier with service requests. For example, as illustrated in the request identifier 1510 column of FIG. 15, packets with a request identifier 11 can have the virtual address X swapped with the address for the producer virtual machine B'. Likewise, packets with a request identifier 12 can have the virtual address X swapped with the address for the producer virtual machine D'.

Embodiments of the disclosure can be described in view of the following clauses:

Clause 1: A method of leasing access to a producer system to obtain access to a service hosted by the producer system, the method comprising:
 by a consumer system comprising one or more processors:
  generating a lease request to access a service of one of a plurality of producer systems;
  providing the lease request to a plurality of leasing agents;
  receiving an identity of one or more of the producer systems from individual leasing agents;
  attempting to initiate a connection with at least some of the producer systems identified by the plurality of leasing agents; and
  in response to successfully establishing a connection with a first producer system from at least some of the producer systems, accessing the service provided by the first producer system.

Clause 2: The method of clause 1, wherein receiving the identity of one or more of the producer systems from of the individual leasing agents comprises receiving an identity of a different producer system from at least two leasing agents of the plurality of leasing agents.

Clause 3: The method of clauses 1 to 2, wherein at least some of the individual leasing agents of the plurality of leasing agents are associated with a non-equivalent set of producer systems.

Clause 4: The method of clauses 1 to 3, wherein receiving the identity of one or more of the producer systems from individual leasing agents comprises receiving a consumable resource for at least some of the identified producer systems.

Clause 5: The method of clause 4, wherein the consumable resource can comprise a lease time, a set of compute cycles, a monetary budget associated with use of the identified producer system, or disk storage, and wherein the lease time comprises a period of time that the consumer system is authorized to access the service at the producer system.

Clause 6: The method of clause 5, wherein, in response to an amount of consumable resource remaining from the consumable resource for the first producer system satisfying a lease threshold, the method further comprises:
 determining a probability that an existing service request for accessing the service at the first producer will not be completed before the consumable resource expires;
 in response to determining that the probability satisfies a renewal threshold, generating a renewal lease request to access the service at the first producer system; and
 providing the renewal lease request to the leasing agent from the plurality of leasing agents that provided the identity of the first producer system.

Clause 7: The method of clause 6, wherein, in response to providing the renewal lease request to the leasing agent, the method further comprises receiving a renewal amount of the consumable resource for the first producer system.

Clause 8: The method of clauses 6 to 7, wherein, in response to providing the renewal lease request to the leasing agent, the method further comprises receiving a new amount of consumable resource for a new producer system, the new producer system differing from the first producer system.

Clause 9: The method of clauses 1 to 8, wherein, in response to successfully establishing the connection with the first producer system from the at least some of the producer systems, the method further comprises obtaining metadata from the first producer system, wherein at least some of the metadata comprises status information relating to the first producer system.

Clause 10: The method of clause 9, further comprising providing at least some of the metadata to the leasing agent from the plurality of leasing agents that provided the identity of the first producer system.

Clause 11: The method of clauses 9 to 10, further comprising providing at least some of the metadata to the plurality of leasing agents.

Clause 12: The method of clauses 1 to 11, wherein in response to successfully establishing a connection with a second producer system from the at least some of the producer systems, accessing a second service at the second producer system.

Clause 13: The method of clause 12, wherein the service and the second service are the same services.

Clause 14: The method of clauses 12 to 13, wherein data accessed using the service and data accessed using the second service differ.

Clause 15: A system for leasing access to a producer system to obtain access to a service hosted by the producer system, the system comprising:
 a consumer system comprising one or more processors, the consumer system further comprising a lease requestor configured to:
  generate a lease request to access a service of a producer system;
  provide the lease request to a plurality of leasing agents; and
  receive an identity of a producer system from at least some of the plurality of leasing agents;
 the consumer system further comprising a connection module configured to attempt to initiate a connection with at least some of the producer systems identified by the plurality of leasing agents; and
 the consumer system further comprising a resource requestor configured to access the service at a first producer system of at least some of the producer systems in response to the connection module successfully establishing a connection with the first producer system.

Clause 16: The system of clause 15, wherein the lease requestor is further configured to receive a lease time for at least some of the identified producer systems, the lease time comprising a period of time that the consumer system is authorized to access the service at the producer system.

Clause 17: The system of clause 16, wherein the connection module is further configured to provide the lease time associated with the first producer system to the first producer system.

Clause 18: The system of clauses 16 to 17, wherein:
 the resource requestor is further configured to determine a probability that an existing service request for accessing the service at the first producer will not be completed before the lease time expires in response to an amount of time remaining from the lease time for the first producer system satisfying a lease threshold; and
 the lease requestor is further configured to:
  generate a renewal lease request to access the service at the first producer system in response to determining that the probability satisfies a renewal threshold; and
  provide the renewal lease request to the leasing agent from the plurality of leasing agents that provided the identity of the first producer system.

Clause 19: The system of clauses 15 to 18, further comprising a status module configured to:
 obtain metadata from the first producer system, wherein at least some of the metadata comprises status information relating to the first producer system; and
 provide at least some of the status information to the leasing agent from the plurality of leasing agents that provided the identity of the first producer system.

Clause 20: A system for leasing access to a producer system to provide access to a service hosted by the producer system, the system comprising:
 a first leasing agent comprising a first leasing system, the first leasing agent implemented in a computer system comprising computer hardware, the first leasing system configured to:
  receive a first request from a consumer system to lease access to a service, the service provided by a number of producer systems;
  identify a first producer system from a first plurality of producer systems based, at least in part, on producer status information associated with individual producer systems of the first plurality of producer systems, wherein the first plurality of producer systems comprises a first subset of the number of producer systems; and
  in response to identifying the first producer system, provide an identity of the first producer system to the consumer system; and
 a second leasing agent comprising a second leasing system configured to:
  receive a second request from the consumer system to lease access to the service;
  identify a second producer system from a second plurality of producer systems based, at least in part, on producer status information associated with the individual producer systems of the second plurality of producer systems, wherein the second plurality of producer systems comprises a second subset of the number of producer systems, the second subset of the number of producer systems non-identical to the first subset of the number of producer systems; and
  in response to identifying the second producer system, provide an identity of the second producer system to the consumer system thereby enabling the consumer system to request access to the service from at least the first producer system and the second producer system, whereby the identification of producer systems is a distributed process that is distributed between at least the first leasing agent and the second leasing agent.

Clause 21: The system of clause 20, wherein the first leasing system is further configured to provide a first lease time to the consumer system, the first lease time comprising a period of time that the consumer system is authorized to access the first producer system, and wherein the second leasing system is further configured to provide a second lease time to the consumer system, the second lease time comprising a period of time that the consumer system is authorized to access the second producer system.

Clause 22: The system of clauses 20 to 21, wherein:
 the first leasing agent further comprises a first status module, the first status module configured to:
  receive first updated status information for the first producer system; and
  update the producer status information for the first producer system based, at least in part, on the first updated status information; and the second leasing agent further comprises a second status module, the second status module configured to:
- receive second updated status information for the second producer system; and
- update the producer status information for the second producer system based, at least in part, on the second updated status information.

Clause 23: The system of clause 22, wherein the first updated status information and the second updated status information are received from the consumer system.

Clause 24: The system of clause 22, wherein the first updated status information is received from the first producer system and the second updated status information is received from the second producer system.

Clause 25: The system of clauses 20 to 24, wherein the first leasing agent is further configured to:
- receive a first lease renewal request from the consumer system to obtain additional lease time for the first producer system;
- determining based, at least in part, on producer status information for the first producer system whether to grant the first lease renewal request; and
- in response to determining to grant the first lease renewal request, providing the consumer system with a first lease renewal time for the first producer system.

Clause 26: The system of clause 25, wherein, in response to determining not to grant the first lease renewal request, the first leasing agent is further configured to:
- identify a third producer system from the first plurality of producer systems based, at least in part, on producer status information associated with each producer system of the first plurality of producer systems; and
- in response to identifying the third producer system, provide an identity of the third producer system to the consumer system.

Clause 27: A method for partitioning producer systems among a plurality of leasing agent systems, the method comprising:
- by a first leasing agent system comprising one or more processors:
  - determining a first set of producer systems available at a first time period;
  - identifying a second set of producer systems available at a second time period, wherein the second time period occurs prior to the first time period;
  - calculating a difference in number between the first set of producer systems and the second set of producer systems;
  - determining whether the difference satisfies a threshold; and
  - in response to determining that the difference satisfies the threshold:
    - partitioning the first set of producer systems among a plurality of leasing agent systems by assigning to individual leasing agent systems a different subset of the first set of producer systems; and
    - for individual leasing agent systems of the plurality of leasing agent systems other than the first leasing agent system, providing the individual leasing agent systems with an identity of the subset of producer systems assigned to the leasing agent system from the first set of producer systems to enable different producer systems from the first set of producer systems to provide services to different consumer systems, whereby the partitioning of the first set of producer systems among the plurality of leasing agent systems enables a balancing of an allocation of the services provided by the first set of producer systems among the different consumer systems.

Clause 28: The method of clause 27, further comprising notifying a set of leasing agent systems from the plurality of leasing agent systems that the first leasing agent system is partitioning the first set of producer systems causing the set of leasing agent systems to refrain from attempting to partition the first set of producer systems while the first leasing agent system is partitioning the first set of producer systems.

Clause 29: The method of clauses 27 to 28, wherein the second set of available producer systems and the second time period comprise values that ensure that the difference satisfies the threshold when the first leasing agent system is activated after a period of non-activation.

Clause 30: The method of clauses 27 to 29, wherein the first set of producer systems comprises a total number of producer systems available at the first time period and wherein the second set of producer systems comprises the total number of producer systems available at the second time period.

Clause 31: The method of clauses 27 to 30, further comprising:
- receiving an indication that at least one of the plurality of leasing agent systems is not available at a third time period;
- identifying a third set of producer systems available at the third time period;
- identifying a set of leasing agent systems available at the third time period;
- partitioning the third set of producer systems among the set of leasing agent systems available at the third time period; and
- for individual leasing agent systems of the set of leasing agent systems available at the third time period, providing the leasing agent system with the identity of a subset of producer systems from the third set of producer systems, the subset of producer systems determined based, at least in part, on said partitioning of the second set of producer systems.

Clause 32: The method of clause 31, wherein the third set of producer systems and the first set of producer systems are the same systems.

Clause 33: The method of clauses 27 to 32, wherein partitioning the first set of producer systems available at the first time period among the plurality of leasing agent systems comprises dividing the first set of producer systems into non-overlapping subsets of producer systems.

Clause 34: The method of clauses 27 to 33, further comprising:
- determining that a producer system from a first subset of producer systems assigned to the first leasing agent system is no longer available; and
- updating a count of available producer systems to reflect that the producer system is no longer available, wherein determining the first set of producer systems available at the first time period is based, at least in part, on the count of available producer systems.

Clause 35: The method of clause 34, wherein determining that the producer system is no longer available comprises receiving a notification from a consumer system that the producer system is unresponsive.

Clause 36: The method of clauses 34 to 35, wherein determining that the producer system is no longer available comprises determining that the producer system is unresponsive to a status request provided by the first leasing agent system.

Clause 37: The method of clauses 27 to 36, further comprising:

receiving a request from a producer system to register with the first leasing agent system;

determining whether the producer system is included in the subset of producer systems assigned to the first leasing agent system; and in response to determining that the producer system is included in the subset of producer systems assigned to the first leasing agent system, registering the producer system at the first leasing agent system.

Clause 38: The method of clause 37, wherein, in response to determining that the producer system is not included in the subset of producer systems assigned to the first leasing agent system, the method further comprises:

identifying a second leasing agent system from the plurality of leasing agent systems assigned to the producer system; and providing the producer system with the identity of the second leasing agent system.

Clause 39: The method of clauses 27 to 38, wherein a consumer system from the different consumer systems accesses different producer systems from the plurality of producer systems at different periods in time.

Clause 40: A system for partitioning producer systems among a plurality of leasing agents, the system comprising:

a plurality of leasing agents including a first leasing agent, wherein individual leasing agents from the plurality of leasing agents comprise one or more processors, the first leasing agent further comprising a partitioning system configured to determine whether a difference between a set of available producer systems at a first time period and the set of available producer systems at a second time period satisfies a threshold; and the partitioning system further configured to, in response to determining that the difference satisfies the threshold:

partition the set of producer systems into multiple subsets of producer systems based on a count of a number of leasing agents included in the plurality of leasing agents to attempt to cause access to the plurality of producer systems by different user systems to be approximately evenly distributed among the plurality of producer systems; and provide, for individual leasing agents of the plurality of leasing agents, an identity of producer systems included in one of the subsets of producer systems to the leasing agent.

Clause 41: The system of clause 40, wherein a number of subsets of producer systems corresponds to the count of the number of leasing agents included in the plurality of leasing agents.

Clause 42: The system of clauses 40 to 41, the partitioning system is further configured to provide individual leasing agents with the identity of producer systems included in a different subset of producer systems from the subsets of producer systems.

Clause 43: The system of clauses 40 to 42, wherein the partitioning system is further configured to alert one or more leasing agents of the plurality of leasing agents, not inclusive of the first leasing agent, that the partitioning system of the first leasing agent is partitioning the set of producer systems.

Clause 44: The system of clauses 40 to 43, wherein, in response to receiving an alert that a second leasing agent from the plurality of leasing agents is partitioning the set of producer systems, the partitioning system of the first leasing agent is further configured to refrain from partitioning the set of producer systems.

Clause 45: The system of clauses 40 to 44, wherein the first leasing agent further comprises a registration module configured to:

receive a request from a producer system to register with the first leasing agent;

determine whether the producer system is included in a subset of producer systems assigned to the first leasing agent;

in response to determining that the producer system is included in the subset of producer systems assigned to the first leasing agent, register the producer system at the first leasing agent; and in response to determining that the producer system is not included in the subset of producer systems assigned to the first leasing agent, identify a second leasing agent from the plurality of leasing agents assigned to the producer system and provide the producer system with the identity of the second leasing agent.

Clause 46: A method of partitioning leases among a plurality of leasing agent systems, the method comprising:

by a first leasing agent system comprising one or more processors:

identifying a set of available producer systems;

determining a number of leases available for individual producer systems of the set of available producer systems;

partitioning the number of leases available for individual producer systems among a plurality of leasing agent systems by assigning individual leasing agent systems from the plurality of leasing agent systems a subset of leases from the number of leases available for individual producer systems; and for individual leasing agent systems of the plurality of leasing agent systems, providing the leasing agent system with the subset of leases assigned to the leasing agent system, whereby the partitioning of the number of leases available for individual producer systems among the plurality of leasing agent systems enables a balancing of a workload among the plurality of leasing agent systems.

Clause 47: The method of clause 46, wherein individual leasing agent systems are assigned a non-overlapping subset of leases.

Clause 48: The method of clauses 46 to 47, wherein providing the leasing agent system with the subset of leases excludes providing the first leasing agent system with the subset of leases assigned to the leasing agent system.

Clause 49: The method of clauses 46 to 48, wherein providing the leasing agent system with the subset of leases assigned to the leasing agent system comprises providing the leasing agent system with the number of leases assigned to the leasing agent system for individual producer systems of the plurality of producer systems.

Clause 50: The method of clauses 46 to 49, wherein providing the leasing agent system with the subset of leases assigned to the leasing agent system comprises providing the leasing agent system with an identifier for individual leases assigned to the leasing agent system.

Clause 51: The method of clauses 46 to 50, wherein partitioning the number of leases available for individual producer systems among the plurality of leasing agent systems comprises partitioning the number of leases available for individual producer systems substantially equally among the plurality of leasing agent systems.

Clause 52: The method of clauses 46 to 51, wherein the plurality of leasing agent systems comprises a subset of a set of leasing agent systems.

Clause 53: The method of clause 52, wherein the plurality of leasing agent systems includes the first leasing agent system.

Clause 54: The method of clauses 46 to 53, wherein the set of available producer systems comprises a subset of available producer systems.

Clause 55: The method of clauses 46 to 54, wherein said partitioning the number of leases available for individual producer systems among the plurality of leasing agent systems occurs in response to a number of total leases available among the set of available producer systems at a first time period changing a threshold amount compared to a second time period.

Clause 56: A method for selecting a producer system from a plurality of producer systems to provide access to a service, the method comprising:
by a first leasing agent system comprising one or more processors:
receiving status information for a plurality of producer systems, wherein individual producer systems of the plurality of producer systems are associated with a selection weight, and wherein at least some of the status information reflects a determination of the status of at least one producer system by at least one consumer system;
modifying producer status information for the plurality of producer systems based, at least in part, on the received status information, the modified producer status information comprising a set of metrics relating to a performance of the plurality of producer systems with respect to interacting with consumer systems;
modifying the selection weights associated with the plurality of producer systems based, at least in part, on a first metric from the set of metrics;
receiving a request from a consumer system to lease access to one of the plurality of producer systems; and
in response to receiving the request to lease access to one of the plurality of producer systems:
selecting a producer system from the plurality of producer systems based, at least in part, on the corresponding selection weight associated with individual producer systems of the plurality of producer systems to service the consumer system;
providing an identity of the selected producer system to a consumer system that provided the request to lease access to one of the plurality of producer systems; and
providing producer status information associated with the selected producer system to the consumer system, wherein at least some of the producer status information is obtained from a second consumer system.

Clause 57: The method of clause 56, wherein the plurality of producer systems comprises a subset of producer systems.

Clause 58: The method of clauses 56 to 57, wherein modifying the selection weights associated with the plurality of producer systems alters a probability that said selecting the producer system selects a specific producer system.

Clause 59: The method of clauses 56 to 58, wherein the status information is received from at least one consumer system.

Clause 60: The method of clause 59, wherein the at least one consumer system includes the consumer system that provided the request to lease access to one of the plurality of producer systems.

Clause 61: The method of clauses 56 to 60, wherein the status information is received from the plurality of producer systems.

Clause 62: The method of clauses 56 to 60, wherein the status information is received from a second leasing agent system.

Clause 63: The method of clauses 56 to 63, further comprising:
determining for a first producer system from the plurality of producer systems whether a corresponding modified selection weight satisfies a removal threshold; and
in response to the modified selection weight satisfying the removal threshold, removing an identity of the first producer system from a list of available producer systems, the list of available producer systems comprising identities of available producer systems corresponding to producer systems from the plurality of producer systems that are available for selection.

Clause 64: The method of clause 63, wherein said selecting the producer system from the plurality of producer systems comprises selecting the producer system from the list of available producer systems.

Clause 65: The method of clauses 63 to 64, further comprising:
tracking a count of producer systems removed from the list of available producer systems; and
in response to the count satisfying a reduction threshold, repartitioning the available producer systems among a plurality of leasing agent systems, the plurality of leasing agent systems including the first leasing agent system.

Clause 66: The method of clause 63, wherein the removal threshold is based on an average value of the first metric for the plurality of producer systems.

Clause 67: The method of clauses 56 to 66, wherein the producer status information provided to the consumer system comprises an independent set of producer status information available to the first leasing agent system, and wherein the independent set of producer status information enables the consumer system to select from a plurality of leased producer systems a less utilized producer system compared to the other leased producer systems.

Clause 68: The method of clauses 56 to 67, wherein selecting the producer system from the plurality of producer systems further comprises selecting one of a first set of producer systems with a lower load than a second set of producer systems.

Clause 69: The method of clause 68, wherein the selected producer system is not associated with a lowest load thereby reducing a frequency of occurrence of load oscillations.

Clause 70: A system for selecting a producer system from a plurality of producer systems to provide access to a service, the system comprising:
a first leasing agent of a plurality of leasing agents, the first leasing agent comprising one or more processors configured to implement a status module and a leasing system;
the status module configured to:
receive status information for a first producer system of a plurality of producer systems, individual producer systems from the plurality of producer systems associated with a selection weight; and
modify the selection weight associated with the first producer system based, at least in part, on the received status information; and the leasing system configured to:
receive a request to access one of the plurality of producer systems; and
select a producer system from the plurality of producer systems, including the first producer system, based, at least in part, on the corresponding selection weight associated with individual producer systems of the plurality of producer systems to service the request.

Clause 71: The system of clause 70, wherein the status information is received at the first leasing agent by the leasing system and wherein the leasing system is further configured to provide the status information to the status module.

Clause 72: The system of clauses 70 to 71, wherein the status module is further configured to:
determine whether the first producer system is assigned to the first leasing agent; and
in response to determining that the first producer is not assigned to the first leasing agent, the status module is further configured to:
identity a second leasing agent assigned to the first producer; and
provide the received status information to the second leasing agent.

Clause 73: The system of clauses 70 to 72, wherein the status module is further configured to:
determine whether the modified selection weight satisfies a removal threshold; and
disassociate the first producer system from the plurality of producer systems in response to the modified selection weight satisfying the removal threshold.

Clause 74: The system of clause 73, wherein the first leasing agent further comprises a partitioning system configured to repartition the plurality of producer systems among the plurality of leasing agents in response to a number of producer systems disassociated from the plurality of producer systems satisfying a reduction threshold.

Clause 75: The system of clauses 70 to 74, wherein the leasing system is further configured to provide an identity of the producer system to a consumer system that provided the request to access one of the plurality of producer systems.

Clause 76: The system of clauses 70 to 75, wherein the selected producer system comprises the first producer system.

Clause 77: Non-transitory physical computer storage comprising computer-executable instructions that, when implemented in one or more processors, direct a computing system to select a producer system from a plurality of producer systems to provide access to a service by at least:
in response to receiving status information at a first leasing agent for a first producer system of a plurality of producer systems, determining whether the first producer is a member of a first subset of producer systems, the first subset of producer systems associated with the first leasing agent, wherein individual producer systems from the plurality of producer systems are associated with a selection weight, the plurality of producer systems partitioned into a number of subsets of producer systems;
in response to determining that the first producer system is a member of the first subset of producer systems, modifying the selection weight associated with the first producer system; and
in response to receiving a request to access a producer system, selecting a second producer system from the first subset of producer systems based, at least in part, on the selection weights associated with the producer systems from the subset of producer systems to service a provider of the request.

Clause 78: The non-transitory physical computer storage of clause 77, wherein the second producer system and the first producer system are the same.

Clause 79: The non-transitory physical computer storage of clauses 77 to 78, wherein, in response to determining that the first producer system is not a member of the first subset of producer systems, the method further comprises:
identifying a second subset of producer systems that includes the first producer system;
identifying a second leasing agent associated with the second subset of producer systems; and
providing the status information to the second leasing agent.

Clause 80: A method of accessing a service provided by a producer virtual machine in an overlay network, the method comprising:
by a consumer system host comprising one or more processors, the consumer system host configured to host one or more consumer virtual machines, wherein at least one of the consumer virtual machines is associated with a first overlay network:
receiving a request to access a service at a producer system from a consumer virtual machine, the consumer virtual machine hosted by the consumer system host, wherein the request includes an inner header, the inner header comprising a consumer virtual machine address associated with the consumer virtual machine and a target virtual address;
accessing a lease pool associated with the consumer virtual machine, the lease pool comprising a set of leased producer virtual machines leased on behalf of the consumer virtual machine;
selecting from the lease pool a leased producer virtual machine from which to access the service;
replacing the target virtual address in the inner header with a producer virtual machine address associated with the leased producer virtual machine;
identifying a producer system host associated with the leased producer virtual machine, the producer system host configured to host one or more producer virtual machines, wherein at least one of the producer virtual machines is associated with the first overlay network;
encapsulating the request with an outer header comprising a producer system host address associated with the producer system host and a consumer system host address associated with the consumer system host; and
providing the request to the producer system host via a network, thereby enabling the producer system host to process the request.

Clause 81: The method of clause 80, wherein selecting the leased producer virtual machine comprises:
determining whether the lease pool includes at least one available leased producer virtual machine; and
in response to determining that the lease pool includes at least one available leased producer virtual machine, selecting one of the available leased producer virtual machines and removing the selecting available leased producer virtual machine from the lease pool.

Clause 82: The method of clause 81, wherein, in response to determining that the lease pool does not include an available leased producer virtual machine, the method further comprises:
obtaining, on behalf of the consumer virtual machine, leases for a set of producer virtual machines included in the first overlay network;

initiating connections with individual producer virtual machines from the set of leased producer virtual machines; and for individual successfully established connections, adding the corresponding producer virtual machine to the lease pool, wherein selecting the leased producer virtual machine further comprises selecting one of the producer virtual machines added to the lease pool and removing the selected producer virtual machine from the lease pool.

Clause 83: The method of clause 82, wherein obtaining leases for the set of producer virtual machines comprises:

generating a request to obtain a lease to a producer virtual machine included in the first overlay network for the consumer virtual machine;

providing the request to obtain the lease to a producer virtual machine to a set of leasing agents; and for at least some of the leasing agents in the set of leasing agents, receiving lease information for a producer virtual machine thereby enabling a connection to be initiated with the producer virtual machine.

Clause 84: The method of clause 83, wherein the set of leasing agents comprises a subset of leasing agents in the network.

Clause 85: The method of clauses 80 to 84, further comprising:

receiving a response to a service request from the producer system host;

de-encapsulating the service response by removing an outer header of the response to obtain access to an inner header of the response;

determining a recipient consumer virtual machine based on the inner header of the response, the recipient consumer virtual machine one of the consumer virtual machines hosted by the consumer system host; and providing the de-encapsulated service response to the recipient consumer virtual machine.

Clause 86: The method of clause 85, wherein the recipient consumer virtual machine and the consumer virtual machine are the same.

Clause 87: The method of clauses 85 to 86, further comprising:

identifying, based on the inner header of the response, a source virtual address associated with a source producer virtual machine associated with the response; and substituting an address included in the inner header associated with the source producer virtual machine with the source virtual address.

Clause 88: The method of clause 87, wherein the source producer virtual machine corresponds to the selected leased producer virtual machine, the source virtual address corresponds to the target virtual address, and the recipient consumer virtual machine corresponds to the consumer virtual machine.

Clause 89: The method of clauses 80 to 88, wherein at least one of the consumer virtual machines is associated with a second overlay network.

Clause 90: The method of clauses 80 to 89, wherein at least one of the producer virtual machines is associated with a second overlay network.

Clause 91: The method of clauses 80 to 90, further comprising:

receiving a second request to access the service;

determining whether a load of the leased producer virtual machine satisfies a load threshold; and in response to determining that the load of the leased producer virtual machine satisfies the load threshold:

selecting from the lease pool a second leased producer virtual machine from which to access the service; and providing the second request to a second producer system host that hosts the second leased producer virtual machine.

Clause 92: The method of clause 91, wherein, in response to determining that the load of the leased producer virtual machine satisfies the load threshold, the method further comprises terminating a connection to the leased producer virtual machine.

Clause 93: A system for accessing a service provided by a producer in an overlay network, the system comprising:

a consumer system host comprising one or more processors, the consumer system host configured to host one or more consumers, the consumer system host comprising:

a mapping repository configured to store a mapping of producers to producer system hosts; and an overlay network proxy configured to:

receive, from a consumer hosted by the consumer system host, a request to access a service at a producer;

select a leased producer from which to access the service, the leased producer leased on behalf of the consumer;

access the mapping repository to identify a producer system host associated with the leased producer, the producer system host configured to host one or more producers; and send the request to the producer system host.

Clause 94: The system of clause 93, wherein:

the mapping repository is further configured to store a lease pool associated with the consumer, the lease pool comprising a set of leased producers leased on behalf of the consumer; and the overlay network proxy is further configured to:

determine whether the lease pool includes at least one available leased producer; and select the leased producer from which to access the service from the available leased producers in response to determining that the lease pool includes at least one available leased producer.

Clause 95: The system of clause 94, wherein, in response to determining that the lease pool does not include at least one available leased producer, the overlay network proxy is further configured to:

generate a request to obtain a lease to a producer for the consumer;

provide the request to obtain the lease to a producer to a set of leasing agents; and for at least some of the leasing agents in the set of leasing agents, receive lease information for a producer.

Clause 96: The system of clause 95, wherein the mapping repository is further configured to store the lease information in the lease pool associated with the consumer.

Clause 97: The system of clauses 93 to 95, wherein the overlay network proxy is further configured to:

receive a response to the request from the producer host system;

determine a recipient consumer based on an inner header of the response, the recipient consumer comprising the consumer; and provide the response to the consumer.

Clause 98: The system of clause 97, wherein the overlay network proxy is further configured to:

identify a source virtual address associated with the leased producer; and substitute an address included in the inner header associated with the leased producer with the source virtual address prior to providing the response to the consumer.

Clause 99: The system of clauses 93 to 97, wherein the overlay network proxy is further configured to encapsulate the request with an outer header comprising a producer system host address associated with the producer system host and a consumer system host address associated with the consumer system host.

Clause 100: Non-transitory physical computer storage comprising computer-executable instructions that, when implemented in one or more processors, direct a computing system to access a service provided by a producer virtual machine in an overlay network by at least:
- in response to receiving, from a consumer virtual machine hosted by a consumer system host, a request to access a service at a producer system, the request including a target virtual address, selecting from a lease pool associated with the consumer virtual machine a leased producer virtual machine from which to access the service, the lease pool comprising connection information for producer virtual machines leased on behalf of the consumer virtual machine;
- replacing the target virtual address in a header of the request with a producer virtual machine address associated with the leased producer virtual machine;
- determining a producer system host associated with the leased producer virtual machine; and
- causing the request to be sent the producer system host to be provided to the leased producer virtual machine thereby enabling the lease producer virtual machine to process the request to access the service.

Clause 101: The non-transitory physical computer storage of clause 100, wherein selecting from the lease pool associated with the consumer virtual machine the leased producer virtual machine comprises:
- determining whether the lease pool includes connection information for at least one leased producer virtual machine not currently being used by the consumer virtual machine; and
- in response to determining that the lease pool does not include at least one leased producer virtual machine not currently being used by the consumer virtual machine, the computer-executable instructions further comprise directing the computing system to:
  - obtain, on behalf of the consumer virtual machine, leases for a set of producer virtual machines included in an overlay network;
  - initiating connections with individual producer virtual machines from the set of leased producer virtual machines; and
  - for successfully established connections, adding connection information for the corresponding producer virtual machine to the lease pool.

Clause 102: The non-transitory physical computer storage of clause 101, wherein selecting from the lease pool associated with the consumer virtual machine the leased producer virtual machine further comprises selecting one of the producer virtual machines whose connection information was added to the lease pool.

TERMINOLOGY

A number of computing systems have been described throughout this disclosure. The descriptions of these systems are not intended to limit the teachings or applicability of this disclosure. For example, the user systems described herein can generally include any computing device(s), such as desktops, laptops, video game platforms, television set-top boxes, televisions (e.g., internet TVs), computerized appliances, and wireless mobile devices (e.g. smart phones, PDAs, tablets, or the like), to name a few. Further, it is possible for the user systems described herein to be different types of devices, to include different applications, or to otherwise be configured differently. In addition, the user systems described herein can include any type of operating system ("OS"). For example, the mobile computing systems described herein can implement an Android™ OS, a Windows® OS, a Mac® OS, a Linux or Unix-based OS, or the like.

Further, the processing of the various components of the illustrated systems can be distributed across multiple machines, networks, and other computing resources. In addition, two or more components of a system can be combined into fewer components. For example, the various systems illustrated as part of a leasing agent 102 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each process described may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method for partitioning producer systems among a plurality of leasing agent systems, the method comprising:
   by a first leasing agent system comprising one or more servers configured to perform load balancing across a plurality of producer systems, wherein individual producer systems of the plurality of producer systems comprise one or more servers configured to provide computing resources:
      monitoring a change in a number of available producer systems over time, the change resulting from at least one of an addition of one or more new producer systems to the plurality of producer systems or a loss of one or more existing available producer systems from the plurality of producer systems;
      determining whether a change in the number of available producer systems from a first time period to a second time period satisfies a threshold, wherein the first time period precedes the second time period; and
      in response to determining that the change in the number of available producer systems from the first time period to the second time period satisfies the threshold:
         partitioning the plurality of producer systems among the plurality of leasing agent systems by assigning to individual leasing agent systems a different subset of the plurality of producer systems; and
         for individual leasing agent systems of the plurality of leasing agent systems other than the first leasing agent system, providing the individual leasing agent systems with an identity of the subset of producer systems assigned to the leasing agent system from the plurality of producer systems to enable different producer systems of the plurality of producer systems to provide computing resources to different consumer systems, whereby the partitioning of the plurality of producer systems among the plurality of leasing agent systems enables a balancing of an allocation of the computing resources provided by the plurality of producer systems among the different consumer systems.

2. The method of claim 1, further comprising notifying a set of leasing agent systems from the plurality of leasing agent systems that the first leasing agent system is partitioning the plurality of producer systems causes the set of leasing agent systems to refrain from attempting to partition the plurality of producer systems while the first leasing agent system is partitioning the plurality of producer systems.

3. The method of claim 1, wherein the first time period and a number of producer systems available at the first time period comprise values that ensure that the change in the number of available producer systems from the first time period to the second time period satisfies the threshold when the first leasing agent system is activated after a period of non-activation.

4. The method of claim 1, wherein a first set of producer systems is available at the first time period and a second set of producer systems is available at the second time period, wherein the change in the number of available producer systems from the first time period to the second time period equals a difference between a total number of producer systems in the first set and a total number of producer systems in the second set.

5. The method of claim 4, further comprising:
   receiving an indication that at least one of the plurality of leasing agent systems is not available at a third time period;
   identifying a third set of producer systems available at the third time period;
   identifying a set of leasing agent systems available at the third time period;
   partitioning the third set of producer systems available at the third time period among the set of leasing agent systems available at the third time period; and
   for individual leasing agent systems of the set of leasing agent systems available at the third time period, providing the leasing agent system with an identity of a subset of producer systems from the third set of producer systems, the subset of producer systems determined based, at least in part, on said partitioning of the third set of producer systems.

6. The method of claim 5, wherein the third set of producer systems and the second set of producer systems are the same systems.

7. The method of claim 1, wherein partitioning a first set of producer systems available at the first time period among the plurality of leasing agent systems comprises dividing the first set of producer systems into non-overlapping subsets of producer systems.

8. The method of claim 1, further comprising:
   determining that a producer system from a first subset of producer systems assigned to the first leasing agent system is no longer available; and updating a count of available producer systems to reflect that the producer system is no longer available.

9. The method of claim 8, wherein determining that the producer system is no longer available comprises receiving a notification from a consumer system that the producer system is unresponsive.

10. The method of claim 8, wherein determining that the producer system is no longer available comprises determining that the producer system is unresponsive to a status request provided by the first leasing agent system.

11. The method of claim 1, further comprising:
   receiving a request from a producer system to register with the first leasing agent system;
   determining whether the producer system is included in the subset of producer systems assigned to the first leasing agent system; and
   in response to determining that the producer system is included in the subset of producer systems assigned to the first leasing agent system, registering the producer system at the first leasing agent system.

12. The method of claim 11, wherein, in response to determining that the producer system is not included in the subset of producer systems assigned to the first leasing agent system, the method further comprises:
   identifying a second leasing agent system from the plurality of leasing agent systems assigned to the producer system; and
   providing the producer system with an identity of the second leasing agent system.

13. The method of claim 1, wherein a consumer system from the different consumer systems accesses different producer systems from the plurality of producer systems at different periods in time.

14. A system for partitioning producer systems among a plurality of leasing agents, the system comprising:
   a plurality of leasing agents including a first leasing agent, wherein individual leasing agents from the plurality of leasing agents comprise one or more servers configured to perform load balancing across a plurality of producer systems, wherein individual producer systems of the plurality of producer systems comprise one or more servers configured to provide services or computing resources, the first leasing agent further comprising a partitioning system configured to:
      monitor a change in a number of available producer systems, the change resulting from at least one of an addition of one or more new producer systems to the plurality of producer systems or a loss of one or more existing available producer systems from the plurality of producer systems; and
      determine whether the change in the number of available producer systems satisfies a threshold; and
   the partitioning system further configured to, in response to determining that the change in the number of available producer systems satisfies the threshold:
      partition the plurality of producer systems into multiple subsets of producer systems based on a count of a number of leasing agents included in the plurality of leasing agents to attempt to cause access to the plurality of producer systems by different user systems to be approximately evenly distributed among the plurality of producer systems; and
      provide, for individual leasing agents of the plurality of leasing agents, an identity of producer systems included in one of the subsets of producer systems to the leasing agent.

15. The system of claim 14, wherein a number of subsets of producer systems corresponds to the count of the number of leasing agents included in the plurality of leasing agents.

16. The system of claim 14, the partitioning system is further configured to provide individual leasing agents with the identity of producer systems included in a different subset of producer systems from the subsets of producer systems.

17. The system of claim 14, wherein the partitioning system is further configured to alert one or more leasing agents of the plurality of leasing agents, not inclusive of the first leasing agent, that the partitioning system of the first leasing agent is partitioning the plurality of producer systems.

18. The system of claim 14, wherein, in response to receiving an alert that a second leasing agent from the plurality of leasing agents is partitioning the plurality of producer systems, the partitioning system of the first leasing agent is further configured to refrain from partitioning the plurality of producer systems.

19. The system of claim 14, wherein the first leasing agent is further configured to:
   receive a request from a producer system to register with the first leasing agent;
   determine whether the producer system is included in a subset of producer systems assigned to the first leasing agent;
   in response to determining that the producer system is included in the subset of producer systems assigned to the first leasing agent, register the producer system at the first leasing agent; and
   in response to determining that the producer system is not included in the subset of producer systems assigned to the first leasing agent, identify a second leasing agent from the plurality of leasing, agents assigned to the producer system and provide the producer system with an identity of the second leasing agent.

20. A method of partitioning leases among a plurality of leasing agent systems, the method comprising:
   by a first leasing agent system comprising one or more servers configured to perform load balancing across a plurality of producer systems, wherein individual producer systems of the plurality of producer systems comprise one or more servers configured to provide services or computing resources:
      monitoring a change in a number of leases available for a set of available producer systems, the change resulting from at least one of an addition of one or more new producer systems to the plurality of producer systems or a loss of one or more existing available producer systems from the plurality of producer systems;
      determining whether the change in the number of leases available for the set of available producer systems satisfies a threshold; and
      in response to determining that the change in the number of leases available for the set of available producer systems satisfies the threshold:
         partitioning the number of leases available for individual producer systems among a plurality of leasing agent systems by assigning individual leasing agent systems from the plurality of leasing agent systems a subset of leases from the number of leases available for individual producer systems; and
         for individual leasing agent systems of the plurality of leasing agent systems, providing the leasing agent system with the subset of leases assigned to the leasing agent system, whereby the partitioning of the number of leases available for individual producer systems among the plurality of leasing agent systems enables a balancing of a workload among the plurality of leasing agent systems.

21. The method of claim 20, wherein individual leasing agent systems are assigned a non-overlapping subset of leases.

22. The method of claim 20, wherein providing the leasing agent system with the subset of leases excludes providing the first leasing agent system with the subset of leases assigned to the leasing agent system.

23. The method of claim 20, wherein providing the leasing agent system with the subset of leases assigned to the leasing agent system comprises providing the leasing agent system with the number of leases assigned to the leasing agent system for individual producer systems of the plurality of producer systems.

24. The method of claim 20, wherein providing the leasing agent system with the subset of leases assigned to the leasing agent system comprises providing the leasing agent system with an identifier for individual leases assigned to the leasing agent system.

25. The method of claim 20, wherein partitioning the number of leases available for individual producer systems among the plurality of leasing agent systems comprises partitioning the number of leases available for individual producer systems substantially equally among the plurality of leasing agent systems.

26. The method of claim 20, wherein the plurality of leasing agent systems comprises a subset of a set of leasing agent systems.

27. The method of claim 26, wherein the plurality of leasing agent systems includes the first leasing agent system.

28. The method of claim 20, wherein the set of available producer systems comprises a subset of available producer systems.

29. The method of claim 20, wherein said partitioning the number of leases available for individual producer systems among the plurality of leasing agent systems occurs in response to a number of total leases available among the set of available producer systems at a first time period changing a threshold amount compared to a second time period.

* * * * *